US010045365B2

(12) United States Patent
Jin et al.

(10) Patent No.: US 10,045,365 B2
(45) Date of Patent: Aug. 7, 2018

(54) COMMUNICATION SYSTEM AND METHOD USING D2D FOR OUT-OF-NETWORK COMMUNICATIONS

(71) Applicant: Huawei Technologies Co., Ltd., Shenzhen, Guangdong (CN)

(72) Inventors: Zhe Jin, Beijing (CN); Weiliang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 15/143,177

(22) Filed: Apr. 29, 2016

(65) Prior Publication Data

US 2016/0249377 A1  Aug. 25, 2016

Related U.S. Application Data

(63) Continuation of application No. PCT/CN2013/086248, filed on Oct. 30, 2013.

(51) Int. Cl.
H04W 72/12 (2009.01)
H04W 76/14 (2018.01)
H04W 76/10 (2018.01)
H04W 40/22 (2009.01)
H04W 76/02 (2009.01)
H04W 24/10 (2009.01)
H04W 84/20 (2009.01)

(52) U.S. Cl.
CPC ....... H04W 72/1263 (2013.01); H04W 24/10 (2013.01); H04W 40/22 (2013.01); H04W 76/02 (2013.01); H04W 76/023 (2013.01); H04W 76/10 (2018.02); H04W 76/14 (2018.02); H04W 84/20 (2013.01)

(58) Field of Classification Search
CPC . H04W 72/1263; H04W 24/10; H04W 40/22; H04W 76/02; H04W 76/023
See application file for complete search history.

(56) References Cited

U.S. PATENT DOCUMENTS

| 6,574,266 B1 | 6/2003 | Haartsen | |
| 9,357,459 B2* | 5/2016 | Raghothaman | H04W 36/00 |
| 2010/0009675 A1 | 1/2010 | Wijting et al. | |
| 2012/0224500 A1* | 9/2012 | Shinohara | H04W 84/047 |
| | | | 370/252 |
| 2013/0336161 A1* | 12/2013 | Jung | H04W 76/14 |
| | | | 370/254 |
| 2015/0365846 A1* | 12/2015 | Mattsson | H04W 8/18 |
| | | | 455/466 |

FOREIGN PATENT DOCUMENTS

| CN | 1371583 A | 9/2002 |
| CN | 1893691 A | 1/2007 |
| CN | 101098180 A | 1/2008 |
| WO | WO 2013/086316 A1 | 6/2013 |

* cited by examiner

Primary Examiner — Chi H Pham
Assistant Examiner — Weibin Huang

(57) ABSTRACT

According to a communication method, a network-side device, and a communications system, a D2D connection is established between a master terminal located within network coverage and a slave terminal located beyond the network coverage, and a common communication connection is established between the master terminal and a network-side device, so that indirect communication can be implemented between the slave terminal located beyond the network coverage and the network-side device by using the master terminal.

16 Claims, 12 Drawing Sheets

COMMUNICATION SYSTEM AND METHOD USING D2D FOR OUT-OF-NETWORK COMMUNICATIONS

CROSS-REFERENCE TO RELATED APPLICATIONS

This application is a continuation of International Application No. PCT/CN2013/086248, filed on Oct. 30, 2013, which is hereby incorporated by reference in its entirety.

TECHNICAL FIELD

The present invention relates to the communications field, and in particular, to a communication method, a network-side device, and a communications system.

BACKGROUND

In a conventional communications mode (for example, a communications mode based on a cellular network), a terminal directly communicates with a network-side device in a network coverage area. An example in which a terminal 1 located within coverage of a cellular network communicates with a network-side device (for example, a base station (eNB)) is used. Before the terminal 1 reports a data packet to the eNB, the terminal 1 needs to initiate random access to the eNB by using an air interface and establish a connection to the eNB, and then reports the data packet to the eNB by using the connection to the eNB. Before the eNB delivers a data packet to the terminal 1, the eNB also needs to establish a connection to the terminal 1, and delivers the data packet to the terminal 1 by using the connection to the terminal 1.

It can be seen from the foregoing example that a terminal can communicate with a network-side device only when the terminal is located within network coverage. A terminal beyond the network coverage (for example, the terminal is located in a network coverage blind spot such as a stair corner) cannot communicate with the network-side device, and as a result, a normal communication service cannot be performed. The network-side device can only identify a process of communication with the terminal within the network coverage, but cannot identify communication performed with the terminal beyond the network coverage.

SUMMARY

Embodiments of the present invention provide a communication method, a network-side device, and a communications system, so as to resolve a problem that a terminal beyond network coverage cannot communicate with a network-side device.

According to a first aspect, a communication method is provided, where the communication method includes:

receiving, by a master terminal located within network coverage, a connection establishment request by using a pre-synchronized static resource, where the connection establishment request is sent by a slave terminal located beyond the network coverage, and the connection establishment request includes service type information of a data packet reported by the slave terminal;

establishing, by the master terminal, a connection to the network-side device, where a connection establishment request that is sent by the master terminal to the network-side device carries the service type information, so that the network-side device determines, according to the service type information, that current communication is a communication process of reporting the data packet by the slave terminal; and reporting, by the master terminal to the network-side device, the data packet that is sent by the slave terminal by using an established connection.

With reference to the first aspect, in a first possible implementation manner, after the master terminal establishes the connection to the network-side device and before the master terminal receives the data packet sent by the slave terminal, the method further includes:

receiving, by the master terminal, a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal;

sending, by the master terminal, the measurement configuration message to the slave terminal, and receiving a measurement configuration complete message that is generated after the slave terminal performs measurement on the transmission resource corresponding to the transmission resource information in the measurement configuration message; and reporting, by the master terminal, the measurement configuration complete message to the network-side device.

With reference to the first possible implementation manner of the first aspect, in a second possible implementation manner, that the master terminal receives the data packet sent by the slave terminal specifically includes:

receiving, by the master terminal, resource scheduling information that is determined and sent by the network-side device according to the measurement configuration complete message and that is used for data packet transmission between the master terminal and the slave terminal; and indicating, by the master terminal, transmission resource information in the resource scheduling information to the slave terminal, and receiving the data packet that is sent by the slave terminal on a transmission resource corresponding to the transmission resource information in the resource scheduling information.

With reference to the second possible implementation manner of the first aspect, in a third possible implementation manner, the method further includes:

indicating, by the master terminal, a transmission start message to the slave terminal, to request the slave terminal to send, according to an indication of the transmission start message, the data packet on the transmission resource corresponding to the transmission resource information in the resource scheduling information.

With reference to the first aspect, in a fourth possible implementation manner, before the establishing, by the master terminal, a connection to the network-side device, the method further includes:

receiving, by the master terminal by using the pre-synchronized static resource, the data packet sent by the slave terminal.

With reference to the fourth possible implementation manner of the first aspect, in a fifth possible implementation manner, the master terminal establishes the connection to the network-side device before the master terminal completely receives, by using the pre-synchronized static resource, the data packet sent by the slave terminal; and after the master terminal establishes the connection to the network-side device and before the master terminal completely receives, by using the pre-synchronized static resource, the data packet sent by the slave terminal, the method further includes:

receiving, by the master terminal, a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal;

sending, by the master terminal, the measurement configuration message to the slave terminal, and receiving a measurement configuration complete message that is obtained after the slave terminal performs measurement on the transmission resource corresponding to the transmission resource information; and reporting, by the master terminal, the measurement configuration complete message to the network-side device.

With reference to the fifth possible implementation manner of the first aspect, in a sixth possible implementation manner, before the master terminal completely receives, by using the pre-synchronized static resource, the data packet sent by the slave terminal, the method further includes:

receiving, by the master terminal, resource scheduling information that is determined and sent by the network-side device according to the measurement configuration complete message and that is used for data packet transmission between the master terminal and the slave terminal; and indicating, by the master terminal, transmission resource information in the resource scheduling information to the slave terminal, and receiving the data packet that is sent by the slave terminal on a transmission resource corresponding to the transmission resource information in the resource scheduling information.

According to a second aspect, a communication method is provided, where the communication method includes:

receiving, by a master terminal located within network coverage, a paging query request sent by a network-side device, where the paging query request includes service type information of a data packet that the network-side device requests a slave terminal located beyond the network coverage to report;

sending, by the master terminal, a connection establishment request including the service type information to the slave terminal by using a pre-synchronized static resource, and establishing, by the master terminal, a connection to the network-side device, where a connection establishment request that is sent by the master terminal to the network-side device carries the service type information, so that the network-side device determines, according to the service type information, that current communication is a communication process of reporting the data packet by the slave terminal; and reporting, by the master terminal to the network-side device, the data packet that is sent by the slave terminal by using an established connection.

With reference to the second aspect, in a first possible implementation manner, after the master terminal establishes the connection to the network-side device and before the master terminal receives the data packet sent by the slave terminal, the method further includes:

receiving, by the master terminal, a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal;

sending, by the master terminal, the measurement configuration message to the slave terminal, and receiving a measurement configuration complete message that is obtained after the slave terminal performs measurement on the transmission resource corresponding to the transmission resource information in the measurement configuration message; and reporting, by the master terminal, the measurement configuration complete message to the network-side device.

With reference to the first possible implementation manner of the second aspect, in a second possible implementation manner, that the master terminal receives the data packet sent by the slave terminal specifically includes:

receiving, by the master terminal, resource scheduling information that is determined and sent by the network-side device according to the measurement configuration complete message and that is used for data packet transmission between the master terminal and the slave terminal; and indicating, by the master terminal, transmission resource information in the resource scheduling information to the slave terminal, and receiving the data packet that is sent by the slave terminal on a transmission resource corresponding to the transmission resource information in the resource scheduling information.

With reference to the second possible implementation manner of the second aspect, in a third possible implementation manner, the method further includes:

indicating, by the master terminal, a transmission start message to the slave terminal, to request the slave terminal to send, according to an indication of the transmission start message, the data packet on the transmission resource corresponding to the transmission resource information in the resource scheduling information.

With reference to the second aspect, in a fourth possible implementation manner, before the establishing, by the master terminal, a connection to the network-side device, the method further includes:

receiving, by the master terminal by using the pre-synchronized static resource, the data packet sent by the slave terminal.

With reference to the fourth possible implementation manner of the second aspect, in a fifth possible implementation manner, the master terminal establishes the connection to the network-side device before the master terminal completely receives, by using the pre-synchronized static resource, the data packet sent by the slave terminal; and after the master terminal establishes the connection to the network-side device and before the master terminal completely receives, by using the pre-synchronized static resource, the data packet sent by the slave terminal, the method further includes:

receiving, by the master terminal, a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal;

sending, by the master terminal, the measurement configuration message to the slave terminal, and receiving a measurement configuration complete message that is obtained after the slave terminal performs measurement on the transmission resource corresponding to the transmission resource information; and reporting, by the master terminal, the measurement configuration complete message to the network-side device.

With reference to the fifth possible implementation manner of the second aspect, in a sixth possible implementation manner, before the master terminal completely receives, by using the pre-synchronized static resource, the data packet sent by the slave terminal, the method further includes:

receiving, by the master terminal, resource scheduling information that is determined and sent by the network-side device according to the measurement configuration complete message and that is used for data packet transmission between the master terminal and the slave terminal; and indicating, by the master terminal, transmission resource information in the resource scheduling information to the slave terminal, and receiving the data packet that is sent by the slave terminal on a transmission resource corresponding to the transmission resource information in the resource scheduling information.

According to a third aspect, a communication method is provided, where the communication method includes:

receiving, by a master terminal located within network coverage, a connection establishment request by using a pre-synchronized static resource, where the connection establishment request is sent by a slave terminal located beyond the network coverage, and the connection establishment request includes service type information of a data packet that is delivered by a network-side device to the slave terminal;

establishing, by the master terminal, a connection to the network-side device, where a connection establishment request that is sent by the master terminal to the network-side device carries the service type information, so that the network-side device determines, according to the service type information, that current communication is a communication process of delivering the data packet to the slave terminal; and receiving, by the master terminal, the data packet delivered by the network-side device, and sending the data packet to the slave terminal by using a connection established with the slave terminal.

With reference to the third aspect, in a first possible implementation manner, after the establishing, by the master terminal, a connection to the network-side device and before the receiving the data packet sent by the network-side device, the method further includes:

receiving, by the master terminal, a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal;

sending, by the master terminal, the measurement configuration message to the slave terminal, and receiving a measurement configuration complete message that is generated after the slave terminal performs measurement on the transmission resource corresponding to the transmission resource information in the measurement configuration message; and reporting, by the master terminal, the measurement configuration complete message to the network-side device.

With reference to the first possible implementation manner of the third aspect, in a second possible implementation manner, the sending, by the master terminal, the data packet to the slave terminal specifically includes:

receiving, by the master terminal, resource scheduling information that is determined and sent by the network-side device according to the measurement configuration complete message and that is used for data packet transmission between the master terminal and the slave terminal; and indicating, by the master terminal, transmission resource information in the resource scheduling information to the slave terminal, and sending the data packet to the slave terminal on a transmission resource corresponding to the transmission resource information in the resource scheduling information.

With reference to the second possible implementation manner of the third aspect, in a third possible implementation manner, the method further includes:

indicating, by the master terminal, a transmission start message to the slave terminal, to request the slave terminal to receive, according to an indication of the transmission start message and on the transmission resource corresponding to the transmission resource information in the resource scheduling information, the data packet sent by the master terminal.

With reference to the third possible implementation manner of the third aspect, in a fourth possible implementation manner, the sending, by the master terminal, the data packet to the slave terminal specifically includes:

sending, by the master terminal, the data packet to the slave terminal by using the pre-synchronized static resource.

With reference to the fourth possible implementation manner of the third aspect, in a fifth possible implementation manner, before the master terminal completely sends the data packet to the slave terminal by using the pre-synchronized static resource, the method further includes:

receiving, by the master terminal, a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal;

sending, by the master terminal, the measurement configuration message to the slave terminal, and receiving a measurement configuration complete message that is obtained after the slave terminal performs measurement on the transmission resource corresponding to the transmission resource information; and reporting, by the master terminal, the measurement configuration complete message to the network-side device.

With reference to the fifth possible implementation manner of the third aspect, in a sixth possible implementation manner, the method further includes:

receiving, by the master terminal, resource scheduling information that is determined and sent by the network-side device according to the measurement configuration complete message and that is used for data packet transmission between the master terminal and the slave terminal; and indicating, by the master terminal, transmission resource information in the resource scheduling information to the slave terminal, and sending the data packet to the slave terminal on a transmission resource corresponding to the transmission resource information in the resource scheduling information.

According to a fourth aspect, a communication method is provided, where the communication method includes:

receiving, by a master terminal located within network coverage, a paging query request sent by a network-side device, where the paging query request includes service type information of a data packet that is delivered by the network-side device to a slave terminal located beyond the network coverage;

sending, by the master terminal, a connection establishment request including the service type information to the slave terminal by using a pre-synchronized static resource, and establishing, by the master terminal, a connection to the network-side device, where a connection establishment request that is sent by the master terminal to the network-side device carries the service type information, so that the network-side device determines, according to the service type information, that current communication is a communication process of delivering the data packet to the slave terminal; and receiving, by the master terminal, the data packet delivered by the network-side device, and sending the data packet to the slave terminal by using a connection established with the slave terminal.

With reference to the fourth aspect, in a first possible implementation manner, after the establishing, by the master terminal, a connection to the network-side device and before the receiving the data packet sent by the network-side device, the method further includes:

receiving, by the master terminal, a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal;

sending, by the master terminal, the measurement configuration message to the slave terminal, and receiving a measurement configuration complete message that is obtained after the slave terminal performs measurement on the transmission resource corresponding to the transmission resource information in the measurement configuration message; and reporting, by the master terminal, the measurement configuration complete message to the network-side device.

With reference to the first possible implementation manner of the fourth aspect, in a second possible implementation manner, the sending, by the master terminal, the data packet to the slave terminal specifically includes:

receiving, by the master terminal, resource scheduling information that is determined and sent by the network-side device according to the measurement configuration complete message and that is used for data packet transmission between the master terminal and the slave terminal; and indicating, by the master terminal, transmission resource information in the resource scheduling information to the slave terminal, and sending the data packet to the slave terminal on a transmission resource corresponding to the transmission resource information in the resource scheduling information.

With reference to the second possible implementation manner of the fourth aspect, in a third possible implementation manner, the method further includes:

indicating, by the master terminal, a transmission start message to the slave terminal, to request the slave terminal to receive, according to an indication of the transmission start message and on the transmission resource corresponding to the transmission resource information in the resource scheduling information, the data packet sent by the master terminal.

With reference to the fourth aspect, in a fourth possible implementation manner, the sending, by the master terminal, the data packet to the slave terminal specifically includes:

sending, by the master terminal, the data packet to the slave terminal by using the pre-synchronized static resource.

With reference to the fourth possible implementation manner of the fourth aspect, in a fifth possible implementation manner, before the master terminal completely sends the data packet to the slave terminal by using the pre-synchronized static resource, the method further includes:

receiving, by the master terminal, a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal;

sending, by the master terminal, the measurement configuration message to the slave terminal, and receiving a measurement configuration complete message that is obtained after the slave terminal performs measurement on the transmission resource corresponding to the transmission resource information; and reporting, by the master terminal, the measurement configuration complete message to the network-side device.

With reference to the fifth possible implementation manner of the fourth aspect, in a sixth possible implementation manner, the method further includes:

receiving, by the master terminal, resource scheduling information that is determined and sent by the network-side device according to the measurement configuration complete message and that is used for data packet transmission between the master terminal and the slave terminal; and indicating, by the master terminal, transmission resource information in the resource scheduling information to the slave terminal, and sending the data packet to the slave terminal on a transmission resource corresponding to the transmission resource information in the resource scheduling information.

According to a fifth aspect, a communications system is provided, where the communications system includes a master terminal located within network coverage, a slave terminal located beyond the network coverage, and a network-side device, where:

the master terminal is configured to receive a connection establishment request by using a pre-synchronized static resource, where the connection establishment request is sent by the slave terminal, and the connection establishment request includes service type information of a data packet reported by the slave terminal; establish a connection to the network-side device; and report, to the network-side device, the data packet that is sent by the slave terminal by using an established connection;

the slave terminal is configured to send the connection establishment request to the master terminal, and send the data packet to the master terminal after establishing the connection to the master terminal; and the network-side device is configured to establish the connection to the master terminal; determine, according to the service type information carried in a connection establishment request sent by the master terminal, that current communication is a communication process of reporting the data packet by the slave terminal; and receive the data packet reported by the master terminal.

With reference to the fifth aspect, in a first possible implementation manner, the network-side device is further configured to send a measurement configuration message including transmission resource information to the master terminal, where a transmission resource corresponding to the transmission resource information is a transmission resource that is determined by the network-side device according to the service type information and that is used to transmit the data packet between the master terminal and the slave terminal; and receive a measurement configuration complete message reported by the master terminal;

the master terminal is further configured to send the received measurement configuration message to the slave terminal; receive the measurement configuration complete message that is generated after the slave terminal performs measurement on the transmission resource corresponding to the transmission resource information in the measurement configuration message; and report the measurement configuration complete message to the network-side device; and the slave terminal is further configured to perform measurement on the transmission resource corresponding to the transmission resource information in the measurement configuration message that is sent by the master terminal, and send the generated measurement configuration complete message to the master terminal.

With reference to the first possible implementation manner of the fifth aspect, in a second possible implementation manner, the master terminal is specifically configured to receive resource scheduling information that is determined and sent by the network-side device according to the measurement configuration complete message and that is used for data packet transmission between the master terminal and the slave terminal; indicate transmission resource information in the resource scheduling information to the slave terminal; and receive the data packet that is sent by the slave terminal on a transmission resource corresponding to the transmission resource information in the resource scheduling information; and the slave terminal is specifically configured to send the data packet to the master terminal on the transmission resource corresponding to the transmission resource information that is indicated by the master terminal.

With reference to the second possible implementation manner of the fifth aspect, in a third possible implementation manner, the master terminal is further configured to indicate a transmission start message to the slave terminal; and the slave terminal is further configured to send, according to an indication of the transmission start message, the data packet on the transmission resource corresponding to the transmission resource information in the resource scheduling information.

With reference to the fifth aspect, in a fourth possible implementation manner, the master terminal is specifically configured to: before establishing the connection to the network-side device, receive, by using the pre-synchronized static resource, the data packet sent by the slave terminal.

With reference to the fourth possible implementation manner of the fifth aspect, in a fifth possible implementation manner, the master terminal is specifically configured to: before completely receiving, by using the pre-synchronized static resource, the data packet sent by the slave terminal, establish the connection to the network-side device; receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is sent after the slave terminal performs measurement on the transmission resource corresponding to the transmission resource information.

With reference to the fifth possible implementation manner of the fifth aspect, in a sixth possible implementation manner, the master terminal is further configured to receive resource scheduling information that is determined and sent by the network-side device according to the measurement configuration complete message and that is used for data packet transmission between the master terminal and the slave terminal; indicate transmission resource information in the resource scheduling information to the slave terminal; and receive the data packet that is sent by the slave terminal on a transmission resource corresponding to the transmission resource information in the resource scheduling information.

According to a sixth aspect, a communications system is provided, where the communications system includes a master terminal located within network coverage, a slave terminal located beyond the network coverage, and a network-side device, where:

the master terminal is configured to receive a paging query request sent by the network-side device, where the paging query request includes service type information of a data packet that the network-side device requests the slave terminal to report; send a connection establishment request including the service type information to the slave terminal by using a pre-synchronized static resource, and establish a connection to the network-side device; and report, to the network-side device, the data packet that is sent by the slave terminal by using an established connection;

the network-side device is configured to send the paging query request to the master terminal; when establishing the connection to the master terminal, determine, according to the service type information carried in a connection establishment request sent by the master terminal, that current communication is a communication process of reporting the data packet by the slave terminal; and receive the data packet reported by the master terminal; and the slave terminal is configured to: after establishing the connection to the master terminal, send the data packet to the master terminal.

With reference to the sixth aspect, in a first possible implementation manner, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is sent after the slave terminal performs measurement on the transmission resource corresponding to the transmission resource information in the measurement configuration message;

the network-side device is further configured to send the measurement configuration message to the master terminal, and receive the measurement configuration complete message reported by the master terminal; and the slave terminal is further configured to perform measurement according to the transmission resource corresponding to the transmission resource information in the measurement configuration message that is sent by the master terminal, and send the generated measurement configuration complete message to the master terminal.

With reference to the first possible implementation manner of the sixth aspect, in a second possible implementation manner, the master terminal is specifically configured to: after receiving resource scheduling information that is determined and sent by the network-side device according to the measurement configuration complete message and that is used for data packet transmission between the master terminal and the slave terminal, indicate transmission resource information in the resource scheduling information to the slave terminal; and receive the data packet that is sent by the slave terminal on a transmission resource corresponding to the transmission resource information in the resource scheduling information; and the slave terminal is specifically configured to send the data packet to the master terminal on the transmission resource corresponding to the transmission resource information that is indicated by the master terminal.

With reference to the second possible implementation manner of the sixth aspect, in a third possible implementation manner, the master terminal is further configured to indicate a transmission start message to the slave terminal; and the slave terminal is specifically configured to send, according to an indication of the transmission start message, the data packet on the transmission resource corresponding to the transmission resource information in the resource scheduling information.

With reference to the sixth aspect, in a fourth possible implementation manner, the master terminal is specifically configured to: before establishing the connection to the network-side device, receive, by using the pre-synchronized static resource, the data packet sent by the slave terminal.

With reference to the fourth possible implementation manner of the sixth aspect, in a fifth possible implementation manner, the master terminal is specifically configured to: before completely receiving, by using the pre-synchronized static resource, the data packet sent by the slave terminal, establish the connection to the network-side device; receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is sent after the slave terminal performs measurement on the transmission resource corresponding to the transmission resource information.

With reference to the fifth possible implementation manner of the sixth aspect, in a sixth possible implementation manner, the master terminal is specifically configured to: after receiving resource scheduling information that is determined and sent by the network-side device according to the measurement configuration complete message and that is used for data packet transmission between the master terminal and the slave terminal, indicate transmission resource information in the resource scheduling information to the slave terminal; and receive the data packet that is sent by the slave terminal on a transmission resource corresponding to the transmission resource information in the resource scheduling information; and the slave terminal is specifically configured to send, according to an indication of the master terminal, the data packet on the transmission resource corresponding to the transmission resource information.

According to a seventh aspect, a communications system is provided, where the communications system includes a master terminal located within network coverage, a slave terminal located beyond the network coverage, and a network-side device, where:

the master terminal is configured to receive a connection establishment request by using a pre-synchronized static resource, where the connection establishment request is sent by the slave terminal, and the connection establishment request includes service type information of a data packet that is delivered by the network-side device to the slave terminal; establish a connection to the network-side device; and receive the data packet delivered by the network-side device, and send the data packet to the slave terminal by using a connection established with the slave terminal;

the network-side device is configured to establish the connection to a network-side network; determine, according to the service type information carried in a connection establishment request sent by the master terminal, that current communication is a communication process of delivering the data packet to the slave terminal; and deliver the data packet to the master terminal; and the slave terminal is configured to send the connection establishment request to the master terminal, and receive the data packet sent by the master terminal.

With reference to the seventh aspect, in a first possible implementation manner, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is generated after the slave terminal performs measurement on the transmission resource corresponding to the transmission resource information in the measurement configuration message.

With reference to the first possible implementation manner of the seventh aspect, in a second possible implementation manner, the master terminal is specifically configured to receive resource scheduling information that is determined and sent by the network-side device according to the measurement configuration complete message and that is used for data packet transmission between the master terminal and the slave terminal; indicate transmission resource information in the resource scheduling information to the slave terminal; and send the data packet to the slave terminal on a transmission resource corresponding to the transmission resource information in the resource scheduling information; and the slave terminal is specifically configured to receive, according to an indication of the master terminal and on the transmission resource corresponding to the transmission resource information, the data packet sent by the master terminal.

With reference to the second possible implementation manner of the seventh aspect, in a third possible implementation manner, the master terminal is further configured to indicate a transmission start message to the slave terminal; and the slave terminal is specifically configured to receive, according to an indication of the transmission start message and on the transmission resource corresponding to the transmission resource information in the resource scheduling information, the data packet sent by the master terminal.

With reference to the seventh aspect, in a fourth possible implementation manner, the master terminal is specifically configured to send the data packet to the slave terminal by using the pre-synchronized static resource.

With reference to the fourth possible implementation manner of the seventh aspect, in a fifth possible implementation manner, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is generated after the slave terminal performs measurement on the transmission resource corresponding to the transmission resource information.

With reference to the fifth possible implementation manner of the seventh aspect, in a sixth possible implementation manner, the master terminal is specifically configured to: after receiving resource scheduling information that is determined and sent by the network-side device according to the measurement configuration complete message and that is used for data packet transmission between the master terminal and the slave terminal, indicate transmission resource information in the resource scheduling information to the slave terminal; and send the data packet to the slave terminal on a transmission resource corresponding to the transmission resource information in the resource scheduling information; and the slave terminal is specifically configured to receive, according to an indication of the master terminal and on the transmission resource corresponding to the transmission resource information, the data packet sent by the master terminal.

According to an eighth aspect, a communications system is provided, where the communications system includes a master terminal located within network coverage, a slave terminal located beyond the network coverage, and a network-side device, where:

the master terminal is configured to receive a paging query request sent by the network-side device, where the paging query request includes service type information of a data packet that is delivered by the network-side device to the slave terminal located beyond the network coverage; send a connection establishment request including the service type information to the slave terminal by using a pre-synchronized static resource, and establish a connection to the network-side device; and receive the data packet delivered by the network-side device, and send the data packet to the slave terminal by using a connection established with the slave terminal;

the network-side device is configured to send the paging query request to the master terminal; establish the connection to the master terminal; determine, according to the service type information carried in a connection establishment request sent by the master terminal, that current communication process is a communication process of delivering the data packet to the slave terminal; and send the data packet to the master terminal; and the slave terminal is configured to receive the connection establishment request sent by the master terminal, and receive, by using the connection established with the master terminal, the data packet sent by the master terminal.

With reference to the eighth aspect, in a first possible implementation manner, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is generated after the slave terminal performs measurement on the transmission resource corresponding to the transmission resource information in the measurement configuration message.

With reference to the first possible implementation manner of the eighth aspect, in a second possible implementation manner, the master terminal specifically receives resource scheduling information that is determined and sent by the network-side device according to the measurement configuration complete message and that is used for data packet transmission between the master terminal and the slave terminal; indicates transmission resource information in the resource scheduling information to the slave terminal; and sends the data packet to the slave terminal on a transmission resource corresponding to the transmission resource information in the resource scheduling information; and the slave terminal is specifically configured to receive, on the transmission resource corresponding to the transmission resource information that is indicated by the master terminal, the data packet sent by the master terminal.

With reference to the second possible implementation manner of the eighth aspect, in a third possible implementation manner, the master terminal is further configured to indicate a transmission start message to the slave terminal; and the slave terminal is specifically configured to receive, according to an indication of the transmission start message and on the transmission resource corresponding to the transmission resource information in the resource scheduling information, the data packet sent by the master terminal With reference to the eighth aspect, in a fourth possible implementation manner, the master terminal is specifically configured to send the data packet to the slave terminal by using the pre-synchronized static resource.

With reference to the fourth possible implementation manner of the eighth aspect, in a fifth possible implementation manner, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is generated after the slave terminal performs measurement on the transmission resource corresponding to the transmission resource information.

With reference to the fifth possible implementation manner of the eighth aspect, in a sixth possible implementation manner, the master terminal is specifically configured to receive resource scheduling information that is determined and sent by the network-side device according to the measurement configuration complete message and that is used for data packet transmission between the master terminal and the slave terminal; indicate transmission resource information in the resource scheduling information to the slave terminal; and send the data packet to the slave terminal on a transmission resource corresponding to the transmission resource information in the resource scheduling information; and the slave terminal is specifically configured to receive, according to an indication of the master terminal and on the transmission resource corresponding to the transmission resource information, the data packet sent by the master terminal.

According to a ninth aspect, a network-side device is provided, where the network-side device includes:

a request receiving module, configured to receive a connection establishment request that carries service type information and that is sent by a master terminal located within network coverage; and determine, according to the service type information, whether current communication is a communication process of delivering a data packet to a slave terminal located beyond the network coverage or a communication process of receiving a data packet reported by the slave terminal;

a connection module, configured to establish a connection to the master terminal; and a transmission module, configured to deliver the data packet to the slave terminal by using the master terminal, or receive the data packet that is reported by the slave terminal by using the master terminal.

According to a tenth aspect, a network-side device is provided, where the network-side device includes:

the transmission interface, configured to receive a connection establishment request that carries service type information and that is sent by a master terminal located within network coverage, and serve as an interface for performing data packet transmission with the slave terminal; and the processor, configured to: receive, by using the transmission interface, the connection establishment request that carries the service type information and that is sent by the master terminal; after determining, according to the service type information, whether current communication is a communication process of delivering a data packet to the slave terminal located beyond the network coverage or a communication process of receiving a data packet reported by the slave terminal, establish a connection to the master terminal; and then, by using the transmission interface 21, deliver the data packet to the slave terminal via the master terminal, or receive the data packet that is reported by the slave terminal via the master terminal.

According to the embodiments of the present invention, a D2D connection is established between a master terminal located within network coverage and a slave terminal located beyond the network coverage, and a common communication connection is established between the master terminal and a network-side device, so that indirect communication can be implemented between the slave terminal located beyond the network coverage and the network-side device by using the master terminal. In addition, when the connection is established between the master terminal and the network-side device, service type information reflecting a data packet reported by the slave terminal (or a data packet delivered by the network-side device and received by the slave terminal) is sent to the network-side device, so that the network-side device can learn that a current communication process is not a process of common communication with the master terminal, but is a process of indirect communication with the slave terminal located beyond the network coverage, which avoids a problem of a communication failure caused by that the network-side device performs communication according to a common communication process.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

Figure 1:
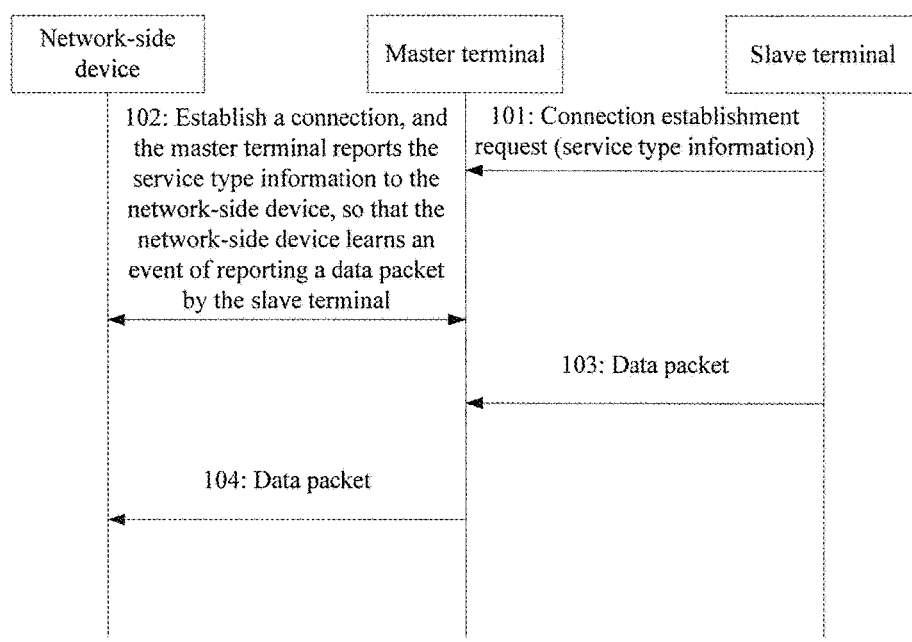
FIG. 1 is a schematic diagram of steps of a communication method according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In the embodiments of the present invention, a twin-UE (Twin-UE) technology is introduced. Based on a D2D (device-to-device) technology, when two terminals both are located within network coverage, the twin-UE technology implements initialized network registration of the twin UEs by means of interaction with a network-side device, and then the twin UEs can enter a normal communication state.

In a network registration process, the twin UEs complete the following configuration process:

1. A static resource is synchronized between the twin UEs. The static resource is an RB resource block that can be used to transmit data or signaling. Static resource synchronization between terminals may be implemented by configuring same resource information (for example, RB resource block information) on two terminals.

2. During network registration, each of the twin UEs obtains its own D2D identifier and a D2D identifier of the peer UE that are delivered by the network-side device. The D2D identifier may be any information that is used to identify a D2D terminal identity. A manner used by either of the twin UEs to identify the peer UE by using a D2D identifier of the peer UE is as follows:

It is assumed that the twin UEs is a UE 1 and a UE 2. When receiving information sent by the UE 1, the UE 2 may use a D2D identifier of the UE 1 to parse the received information. If the received information can be correctly parsed, it can be identified that the UE sending the information is a peer end of the twin UEs; if the received information cannot be correctly parsed, it is identified that the UE sending the information is not a peer end of the twin UEs.

Optionally, D2D identifiers of two of the twin UEs may be set as same identifiers. If either UE learns its own D2D identifier, it is equivalent to that the UE learns a D2D identifier of the peer end.

3. The twin UEs each can receive configuration information delivered by the network-side device, and locally configure, according to the received configuration information, a wake-up period of periodically waking up a subframe. When the wake-up period arrives, the UE may request, with trigger of periodically waking up a subframe, to perform communication with the network-side device.

Based on the twin-UE technology introduced in the embodiments of the present invention, in an initial state, twin UEs both are located within network coverage and perform initialized network registration. Afterwards, the UEs enter a common communication process. As the UEs move, a case in which one of the two UEs is located within the network coverage and the other UE is located beyond the network coverage may occur. In the embodiments of the present invention, the UE located within the network coverage is referred to as a master terminal (DM-UE), and the UE located beyond the network coverage is referred to as a slave terminal (DS-UE).

The slave terminal is located beyond the network coverage, and cannot directly communicate with a network-side device. Therefore, in the embodiments of the present invention, a D2D connection is established between the master terminal and the slave terminal by using a pre-synchronized static resource, and a common communication connection is established between the master terminal within the network coverage and the network-side device, to implement indirect communication between the slave terminal and the network-side device (including reporting a data packet by the slave terminal to the network-side device and sending a data packet by the network-side device to the slave terminal). In addition, when the connection is established between the master terminal and the network-side device, service type information reflecting a data packet reported by the slave terminal (or a data packet received by the slave terminal) is sent to the network-side device, so that the network-side device can learn that a current communication process is not a process of common communication with the master terminal, but is a process of indirect communication with the slave terminal located beyond the network coverage, which resolves a problem that a terminal beyond the network coverage cannot communicate with the network-side device, and further avoids a problem of a communication failure caused by that the network-side device does not identify the process of communication with the slave terminal but performs communication according to a common communication process.

It should be noted that the solutions in the embodiments of the present invention may be applied to multiple network systems, for example, GSM (Global System for Mobile Communications, Global System for Mobile Communications), TD-SCDMA (Time Division Synchronized Code Division Multiple Access, Time Division Synchronized CDMA system), and LTE (Long term evaluation). The target network systems are not limited in the embodiments of the present invention.

The network-side device involved in the embodiments of the present invention varies with a target network system. For example, when being applied to a cellular LTE network system, the network-side device may be a base station (eNB). The network-side device is not limited in the embodiments of the present invention.

The following describes the solutions of the present invention in detail by using specific embodiments.

Embodiment 1

Embodiment 1 of the present invention describes a communication method in which a slave terminal actively reports a data packet to a network-side device. As shown in FIG. 1, the method in Embodiment 1 mainly includes the following steps:

Step 101: A master terminal located within network coverage receives a connection establishment request by using a pre-synchronized static resource, where the connection establishment request is sent by the slave terminal located beyond the network coverage, and the connection establishment request includes service type information of a data packet reported by the slave terminal.

The master terminal and the slave terminal are twin UEs that have performed initialized network registration in advance. In a current state, the master terminal is located within the network coverage, the slave terminal is located beyond the network coverage, and a connection may be established between the master terminal and the slave terminal by using the pre-synchronized static resource.

The service type information that is sent by the slave terminal to the master terminal reflects content including but not limited to the following three aspects:

In a first aspect, it is reflected that a current data packet transmission process is a process in which the slave terminal located beyond the network coverage reports the data packet to the network-side device by using the master terminal, but is not a process of common data packet transmission between the master terminal located within the network coverage and the network-side device.

In a second aspect, a flow direction of data packet transmission is reflected: the slave terminal reports a data packet to the network-side device or the network-side device delivers a data packet to the slave terminal. In Embodiment 1, the service type information reflects a communication process in which the slave terminal reports a data packet to the network-side device. The service type information may carry an identifier indicating uplink transmission.

In a third aspect, a data volume of a data packet to be sent by the slave terminal is reflected: the network-side device may perform, according to the service type information, resource configuration for a process of data packet transmission between the master terminal and the slave terminal, and the network-side device and the master terminal may determine a size of space that needs to be opened up for storing the data packet, and the like.

In step 101, the slave terminal actively requests to establish the connection to the master terminal by using the pre-synchronized static resource, which may be applied in the following scenario:

When the slave terminal has data to be reported to the network-side device (for example, when a wake-up period that is of periodically waking up a subframe and is configured on the slave terminal arrives, with trigger of periodically waking up a subframe, there is periodic service data to be reported to the network-side device, or the slave terminal has burst service data to be reported to the network-side device), if the slave terminal detects that the slave terminal is located beyond the network coverage and cannot directly communicate with the network-side device, the slave terminal requests the master terminal to establish the connection by using the pre-synchronized static resource.

Step 102: The master terminal establishes a connection to the network-side device, where a connection establishment request that is sent by the master terminal to the network-side device carries the service type information, so that the network-side device determines, according to the service type information, that current communication is a communication process of reporting the data packet by the slave terminal.

In the solution of step 102, the connection may be established between the master terminal located within the network coverage and the network-side device according to an existing common technology. For example, when the network-side device is an eNB in an LTE network system, the master terminal may initiate random access to the eNB by using an air interface, and establish a connection to the eNB.

When establishing the connection to the network-side device, the master terminal sends, to the network-side device, the connection establishment request carrying the service type information. After receiving the service type information, the network-side device can determine that a current communication process is not a process of common communication with the master terminal within the network coverage, but is a process of communication with the slave terminal that is located beyond the network coverage and is corresponding to the master terminal, and determine that a flow direction of the data packet is from the slave terminal to the network-side device.

Step 103: The master terminal receives, by using a connection established with the slave terminal, the data packet sent by the slave terminal.

In the solution of step 103, after establishing the connection to the network-side device, the master terminal may return a response message to the slave terminal, and complete a connection establishment handshake with the slave terminal.

It should be noted that in the solution of this embodiment, a sequence of a process of receiving, by the master terminal, the data packet sent by the slave terminal and a process of establishing, by the master terminal, the connection to the network-side device is not fixed, and in this embodiment of the present invention, is not limited to: after the master terminal establishes the connection to the network-side device, the master terminal receives the data packet sent by the slave terminal; or after the master terminal receives the data packet sent by the slave terminal, the master terminal establishes the connection to the network-side device; or the master terminal establishes the connection to the network-side device in the process in which the master terminal receives the data packet sent by the slave terminal. In an actual running process, a proper execution sequence may be selected according to an actual situation.

The data packet may be transmitted between the master terminal and the slave terminal directly by using the pre-synchronized static resource; the network-side device may perform resource scheduling for a process of D2D transmission between the master terminal and the slave terminal, and the master terminal and the slave terminal perform data packet transmission by using a resource scheduled by the network-side device; or the master terminal and the slave terminal may perform data packet transmission by using the pre-synchronized static resource and a resource scheduled by the network-side device together.

Step 104: The master terminal reports the received data packet to the network-side device by using the connection to the network-side device.

The connection between the master terminal and the network-side device may be an RRC (Radio Resource Control, radio resource control)-based connection.

In the solution of step 104, a process of transmitting the data packet between the master terminal located within the network coverage and the network-side device may be implemented according to an existing common technology. For example, when the network-side device is an eNB in an LTE network system, the master terminal may apply for Uu interface scheduling according to a standard procedure to report, to the eNB, the data packet from the slave terminal.

According to the solution in Embodiment 1 of the present invention, a connection is established between a slave terminal in twin UEs that is located beyond network coverage and a master terminal within the network coverage, a connection is established between the master terminal and a network-side device, and the slave terminal indirectly sends a data packet to the network-side device, so that a terminal beyond the network coverage can communicate with the network-side device, which is of great significance for a normal communication process of the terminal beyond the network coverage. In addition, before the data packet is reported to the network-side device, the network-side device has determined, according to received service type information, that current communication is a process of reporting the data packet by the slave terminal to the network-side device, but is not a process of common communication with the master terminal, which avoids a problem of a communication failure caused by that the network-side device performs communication according to a common communication process.

Based on the solution in Embodiment 1, the network-side device may further perform, according to the received service type information, resource configuration for a process of data packet transmission between the master terminal and the slave terminal. The following describes the solution in Embodiment 1 of the present invention in detail by using Embodiment 2.

Embodiment 2

Figure 2:
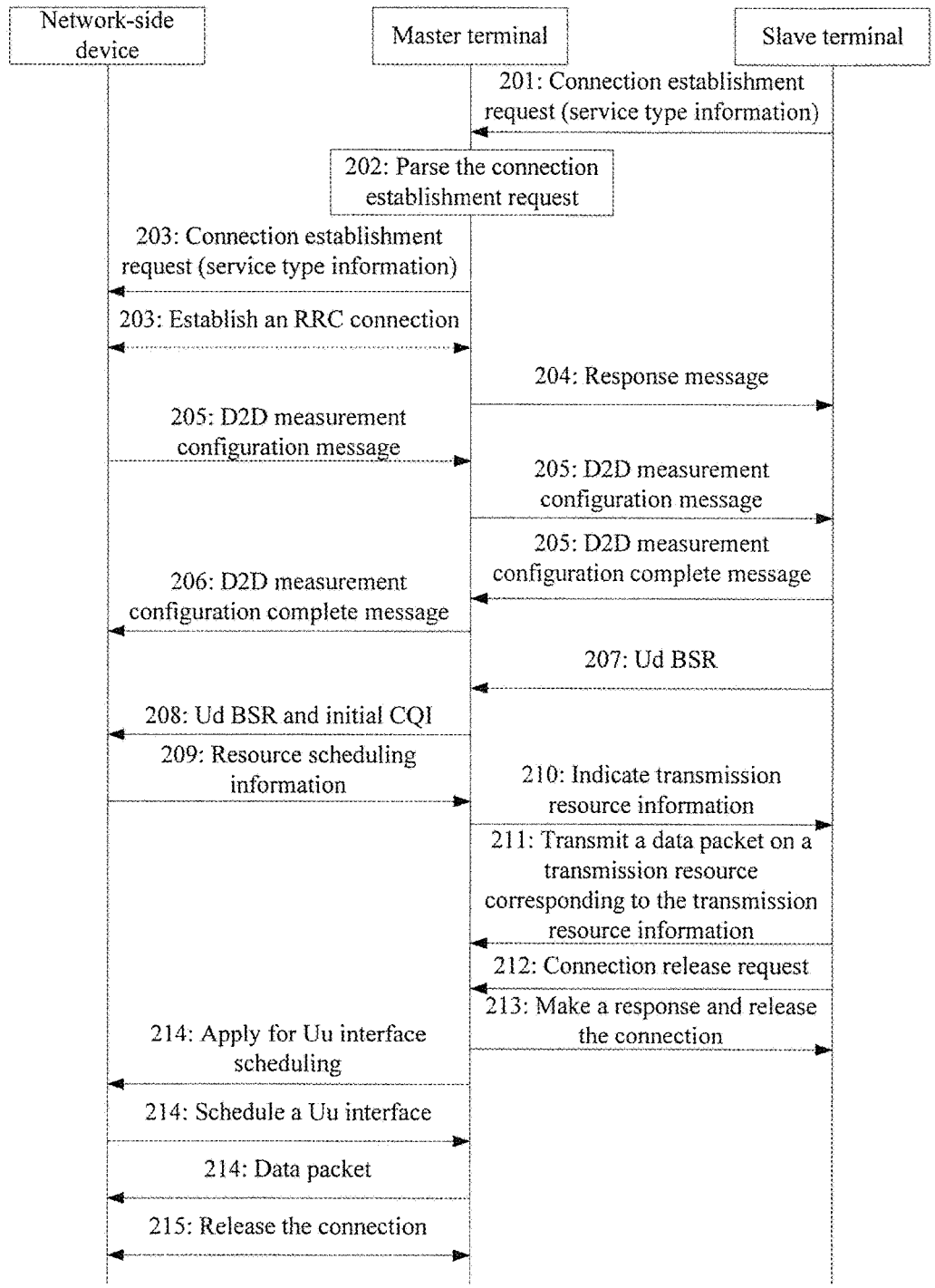
FIG. 2 is a schematic diagram of steps of a communication method according to Embodiment 2 of the present invention.

As shown in FIG. 2, FIG. 2 is a schematic diagram of steps of a communication method according to Embodiment 2 of the present invention. The communication method mainly includes the following steps:

Step 201: A slave terminal sends a connection establishment request to a corresponding master terminal by using a pre-synchronized static resource, where the connection establishment request includes service type information of a data packet reported by the slave terminal.

A specific implementation process of step 201 is the same as a specific implementation process of step 101 in Embodiment 1.

Step 202: The master terminal parses the connection establishment request according to a D2D identifier of the slave terminal.

The slave terminal and the master terminal are twin UEs, and the twin UEs have performed initialized network registration. Therefore, a common connection establishment process (for example, a common random access channel (RACH)-based connection establishment process) is not required between the slave terminal and the master terminal, and the slave terminal may directly send the connection establishment request to the master terminal by using a static resource that is configured during the initialized network registration.

In step 202, during the initialized network registration, each of the twin UEs obtains its own D2D identifier and a D2D identifier of the peer UE that are delivered by a network-side device (actually, the twin UEs may use a same D2D identifier). Therefore, the master terminal may use the D2D identifier of the slave terminal to parse the received connection establishment request. If the connection establishment request can be successfully parsed, it is determined that the slave terminal is a peer end of the twin UEs; otherwise, the current communication process is rejected.

Step 203: The master terminal establishes a connection to a network-side device, where a connection establishment request that is sent by the master terminal to the network-side device carries the service type information, so that the network-side device determines, according to the service type information, that current communication is a communication process of reporting the data packet by the slave terminal.

A specific implementation process of step 203 is the same as a specific implementation process of step 102 in Embodiment 1.

Step 204: The master terminal returns a response message to the slave terminal, and completes a connection establishment handshake with the slave terminal.

The response message is a response message for the connection establishment request that is sent by the slave terminal to the master terminal in step 201. In this case, a connection between the master terminal and the slave terminal is a D2D connection.

Step 205: The network-side device configures measurement information for the twin UEs.

A specific implementation manner of step 205 includes but is not limited to:

First, the network-side device determines, according to the received service type information, a transmission resource used to transmit the data packet between the master terminal and the slave terminal; and sends, to the master terminal, a D2D measurement configuration message carrying transmission resource information corresponding to the transmission resource.

The transmission resource may include a part or all of the pre-synchronized static resource, and may further include another transmission resource that can be used to transmit the data packet between the master terminal and the slave terminal.

Then, the master terminal sends the D2D measurement configuration message to the slave terminal by using the pre-synchronized static resource.

Finally, the slave terminal performs measurement on the transmission resource corresponding to the transmission resource information in the D2D measurement configuration message; and after the measurement is complete, sends a D2D measurement configuration complete message to the master terminal by using the pre-synchronized static resource.

Step 206: The master terminal reports the D2D measurement configuration complete message to the network-side device. A process of measuring the transmission resource is complete.

The foregoing step 205 and step 206 are preferred steps in this embodiment of the present invention. In this embodiment of the present invention, a measurement operation may not be performed on the transmission resource, and data packet transmission may be directly performed between the master terminal and the slave terminal by using the pre-synchronized static resource.

Step 207: The slave terminal sends a Ud BSR (a buffer status report of a link between the master terminal and the slave terminal).

The Ud BSR is a parameter used for an initial scheduling operation. If a matched scheduling parameter is determined between the master terminal and the slave terminal according to a service type and a preset protocol, the slave terminal may not send the Ud BSR to the master terminal in step 207.

Step 208: The master terminal initiates an SR (Scheduling Request, scheduling request) to report the Ud BSR and an initial CQI (Channel Quality Indicator, channel quality indicator) to the network-side device.

In step 208, the master terminal may request, in a common manner, the network-side device for resource scheduling. However, a difference from the common manner lies in that, the master terminal requests the network-side device for resource scheduling for D2D communication with the slave terminal.

Step 209: The network-side device sends, to the master terminal, resource scheduling information for performing data packet transmission between the master terminal and the slave terminal.

In step 209, the network-side device determines, according to the Ud BSR and the initial CQI that are reported by the master terminal, and the D2D measurement configuration complete message received in the process of measuring the transmission resource, a transmission resource for performing D2D transmission between the master terminal and the slave terminal; and sends transmission resource information corresponding to the transmission resource to the master terminal by using the resource scheduling information to carry the transmission resource information.

Step 210: After detecting the transmission resource information from the resource scheduling information, the master tell iinal indicates the transmission resource information to the slave terminal by using an indication message.

The transmission resource information may be location information of an RB resource block used for transmitting the data packet. The transmission resource corresponding to the transmission resource information may be a part or all of each resource in the pre-synchronized static resource and the transmission resource measured by the slave terminal.

Optionally, the master terminal may further add a field in the indication message sent to the terminal, and uses the added field to carry a transmission start message, so that when a time specified in the transmission start message arrives, the slave terminal sends the data packet on the transmission resource corresponding to the transmission resource information.

Step 211: The slave terminal sends the data packet to the master terminal on the transmission resource corresponding to the transmission resource information.

In step 211, the slave terminal may send the data packet to the master terminal in a common D2D transmission mode (for example, a DMC (direct communication between terminals) transmission mode) on the transmission resource corresponding to the transmission resource information, and send control information such as an MCS (Modulation and Coding Scheme, modulation and coding scheme) and an NDI (New Data Indicator, new data indicator) to the master terminal together.

Step 212: After the data packet transmission between the master terminal and the slave terminal ends, the slave terminal initiates a connection release request to the master terminal.

The connection release request may be sent to the master terminal by using the pre-synchronized static resource, or may be sent to the master terminal by using the transmission resource used to transmit the data packet between the slave terminal and the master terminal.

Step 213: The master terminal responds to the request of the slave terminal, and releases the connection to the slave terminal Step 214: The master terminal reports, to the network-side device, the data packet sent by the slave terminal.

Step 215: After the master terminal completely sends the data packet to the network-side device, the master terminal requests the network-side device to release the connection to the network-side device. The current communication process ends.

The solution in Embodiment 2 in the foregoing is described by using an example in which a master terminal receives, after a connection is established between the master terminal and a network-side device, a data packet sent by a slave terminal. In Embodiment 3 of the present invention, the solution in Embodiment 1 of the present invention is described in detail by using an example in which a master terminal first receives a data packet sent by a slave terminal, and then establishes a connection to a network-side device.

Embodiment 3

Figure 3:
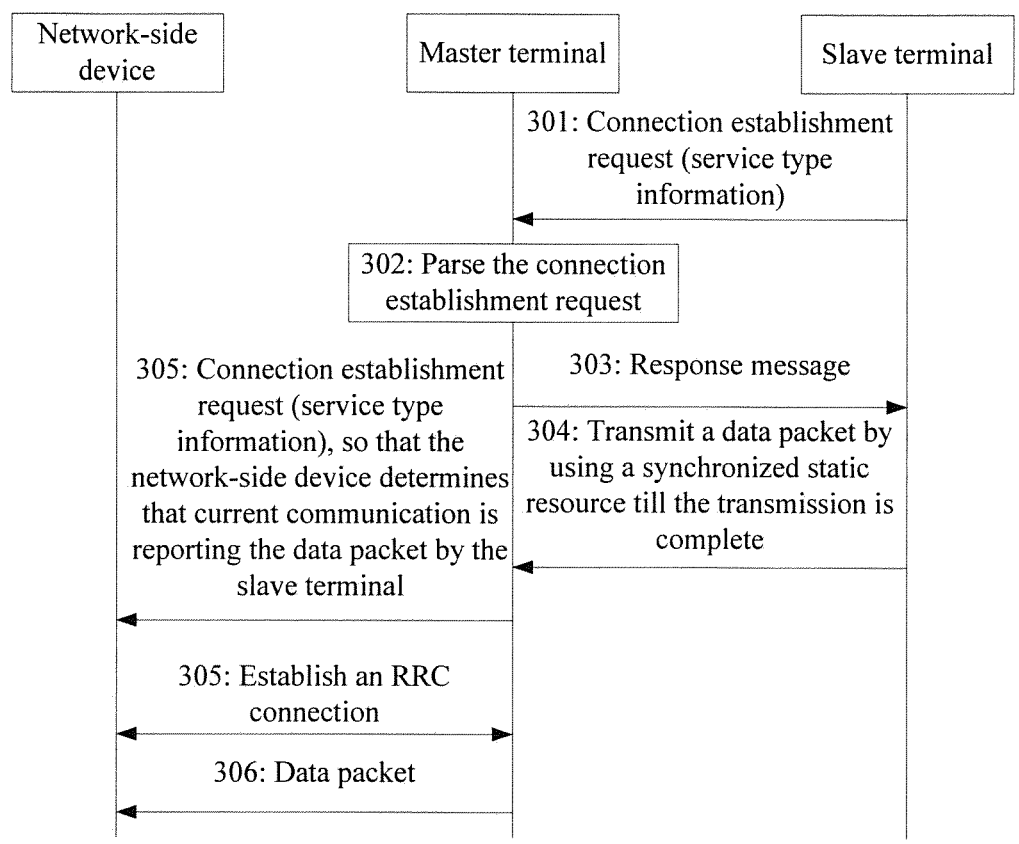
FIG. 3 (a) and FIG. 3 (b) are schematic diagrams of steps of a communication method according to Embodiment 3 of the present invention.
Figure 3:
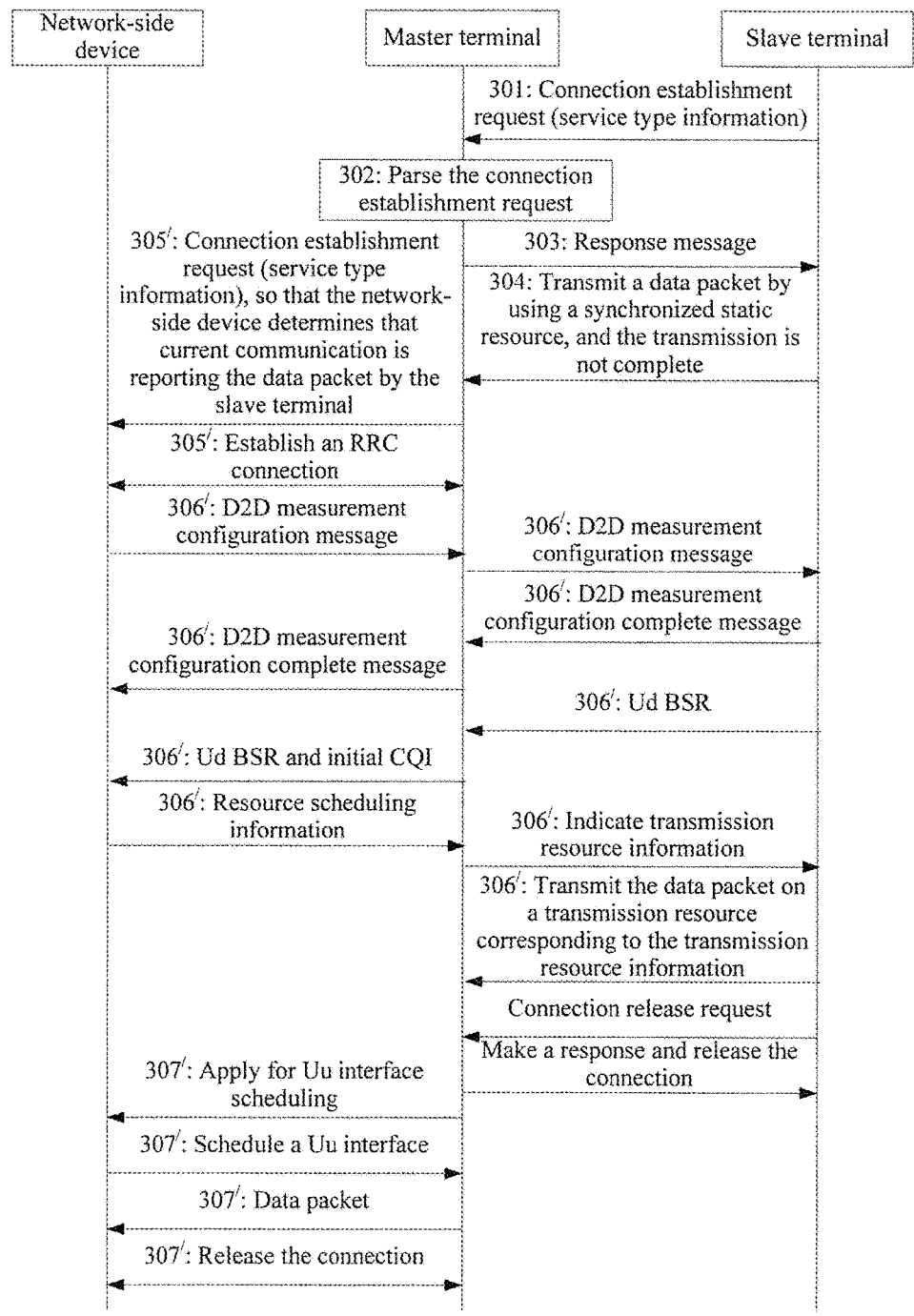

As shown in FIG. 3 (*a*), FIG. 3 (*a*) is a schematic diagram of steps of a communication method according to Embodiment 3 of the present invention. The communication method mainly includes the following steps:

Step 301: A slave terminal sends a connection establishment request to a corresponding master terminal by using a pre-synchronized static resource, where the connection establishment request includes service type information of a data packet reported by the slave terminal.

A specific implementation process of step 301 is the same as a specific implementation process of step 101 in Embodiment 1.

Step 302: The master terminal parses the connection establishment request according to a D2D identifier of the slave terminal.

A specific implementation process of step 302 is the same as a specific implementation process of step 202 in Embodiment 2.

Step 303: The master terminal returns a response message to the slave terminal, and completes a connection establishment handshake with the slave terminal.

Step 304: The master terminal receives, by using the pre-synchronized static resource, the data packet sent by the slave terminal.

Step 305: After the slave terminal completely sends the data packet, the master terminal establishes a connection to a network-side device, where a connection establishment request that is sent by the master terminal to the network-side device carries the service type information, so that the network-side device determines, according to the service type information, that current communication is a communication process of reporting the data packet by the slave terminal.

Step 306: The master terminal reports, to the network-side device, the data packet sent by the slave terminal. The current communication process is complete.

The foregoing solution of step 301 to step 306 is described by using an example in which a master terminal establishes a connection to a network-side device after completing data packet transmission with a slave terminal. Alternatively, the master terminal may establish the connection to the network-side device in a process of performing data packet transmission with the slave terminal, that is, before step 304 ends, as shown in FIG. 3 (*b*), the following steps are further included:

Step 305': Before the slave terminal completely sends the data packet, the master terminal establishes a connection to the network-side device, where a connection establishment request that is sent by the master terminal to the network-side device carries the service type information, so that the network-side device determines, according to the service type information, that current communication is a communication process of reporting the data packet by the slave terminal.

Step 306': The network-side device performs resource configuration for a process of data packet transmission between the master terminal and the slave terminal, so that the master terminal and the slave terminal perform data packet transmission on a transmission resource configured by the network-side device.

An implementation process of step 306' is the same as an implementation process of step 205 to step 211 in Embodiment 2.

Step 307': The master terminal reports, to the network-side device, the data packet sent by the slave terminal. The current communication process is complete.

According to the solutions in Embodiment 2 and Embodiment 3 of the present invention, a technical effect that is the same as a technical effect of Embodiment 1 can be achieved; and further, efficiency of data packet transmission between a master terminal and a slave terminal can be effectively improved because a network-side device performs resource configuration for a process of data packet transmission between the master terminal and the slave terminal. In addition, when data packet transmission is performed between the master terminal and the slave terminal, the slave terminal performs data packet transmission only when a time specified in a transmission start message sent by the master terminal arrives, which implements scheduled sending of a data packet.

The solutions in Embodiment 1 to Embodiment 3 in the foregoing are described by using an example in which a slave terminal actively reports a data packet to a network-side device. The solutions in the embodiments of the present invention are not limited to a solution in which a network-side device actively requests a slave terminal to report a data packet, which is described in the following by using Embodiment 4 to Embodiment 6.

Embodiment 4

Figure 4:
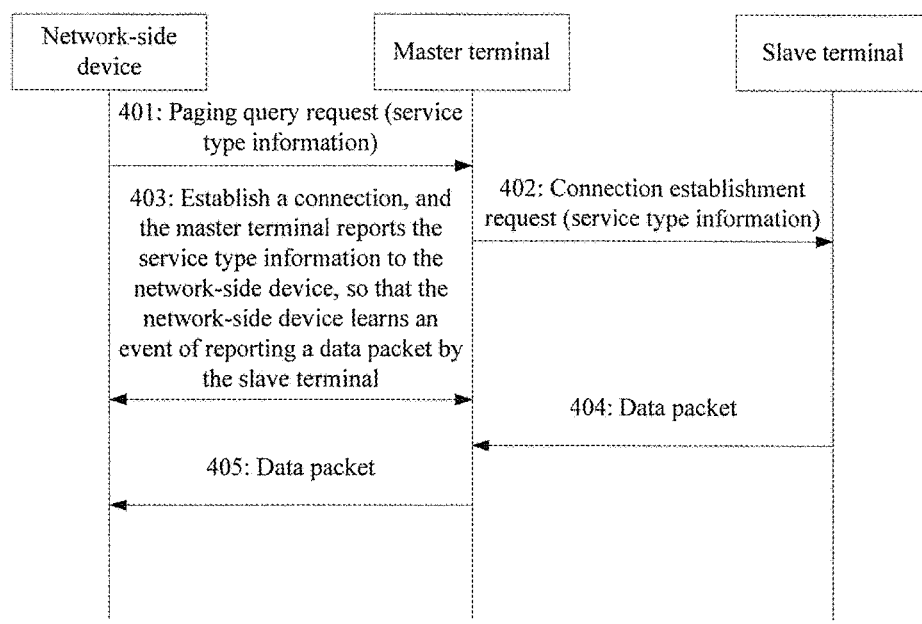
FIG. 4 is a schematic diagram of steps of a communication method according to Embodiment 4 of the present invention.

As shown in FIG. 4, FIG. 4 is a schematic diagram of steps of a communication method according to Embodiment 4 of the present invention. The communication method mainly includes the following steps:

Step 401: A master terminal located within network coverage receives a paging query request sent by a network-side device, where the paging query request includes service type information of a data packet that the network-side device requests a slave terminal located beyond the network coverage to report.

In the solution of step 401, when expecting to receive data reported by the slave terminal, the network-side device may determine, according to information of twin UEs that is recorded during initialized network registration, the master terminal corresponding to the slave terminal, and send the paging query request to the master terminal within the network coverage.

Being similar to the service type information involved in Embodiment 1, the service type information in Embodiment 4 may also reflect content of the following three aspects:

In a first aspect, it is reflected that a current data packet transmission process is a process in which the slave terminal located beyond the network coverage reports the data packet to the network-side device by using the master terminal, but is not a process of common data packet transmission between the master terminal located within the network coverage and the network-side device.

In a second aspect, a flow direction of data packet transmission is reflected: the slave terminal reports a data packet to the network-side device (uplink transmission) or the network-side device delivers a data packet to the slave terminal (downlink transmission). In Embodiment 4, the service type information indicates a process in which the slave terminal reports a data packet to the network-side device, and may carry an identifier indicating uplink transmission.

In a third aspect, a data volume of a data packet that the network-side device expects the slave terminal to send is reflected. The network-side device may perform, according to the service type information, resource configuration for a process of data packet transmission between the master terminal and the slave terminal, the master terminal may determine, according to the service type information, a size of space that needs to be opened up for storing the data packet, and the slave terminal may determine, according to the service type information, a device resource (for example, a memory resource) required to send the data packet to the master terminal.

Step 402: The master terminal initiates a connection establishment request including the service type information to the slave terminal by using a pre-synchronized static resource.

Step 403: The master terminal establishes a connection to the network-side device, where a connection establishment request that is sent by the master terminal to the network-side device carries the service type information, so that the network-side device determines, according to the service type information, that current communication is a communication process of reporting the data packet by the slave terminal.

An implementation process of step 403 is the same as an implementation process of step 102 in Embodiment 1.

Step 404: The master terminal receives, by using a connection established with the slave terminal, the data packet sent by the slave terminal.

An implementation process of step 404 is the same as an implementation process of step 103 in Embodiment 1.

Step 405: The master terminal reports the received data packet to the network-side device by using the connection to the network-side device.

An implementation process of step 405 is the same as an implementation process of step 104 in Embodiment 1.

According to the solution in Embodiment 4 of the present invention, when a network-side device requests a slave terminal located beyond network coverage to report a data packet, a master terminal within the network coverage is triggered to actively establish a connection to the slave terminal and a connection between the master terminal and the network-side device, so that the slave terminal can indirectly send the data packet to the network-side device, which implements communication between a terminal beyond the network coverage and the network-side device. In addition, before the data packet is reported to the network-side device, the network-side device has determined, according to received service type information, that current communication is a process of reporting the data packet by the slave terminal to the network-side device, but is not a process of common communication with the master terminal, which avoids a problem of a communication failure caused by that the network-side device performs communication according to a common communication process.

Based on the solution in Embodiment 4, the network-side device may further perform, according to the received service type information, resource configuration for a process of data packet transmission between the master terminal and the slave terminal. The following describes the solution in Embodiment 4 of the present invention in detail by using Embodiment 5.

Embodiment 5

Figure 5:
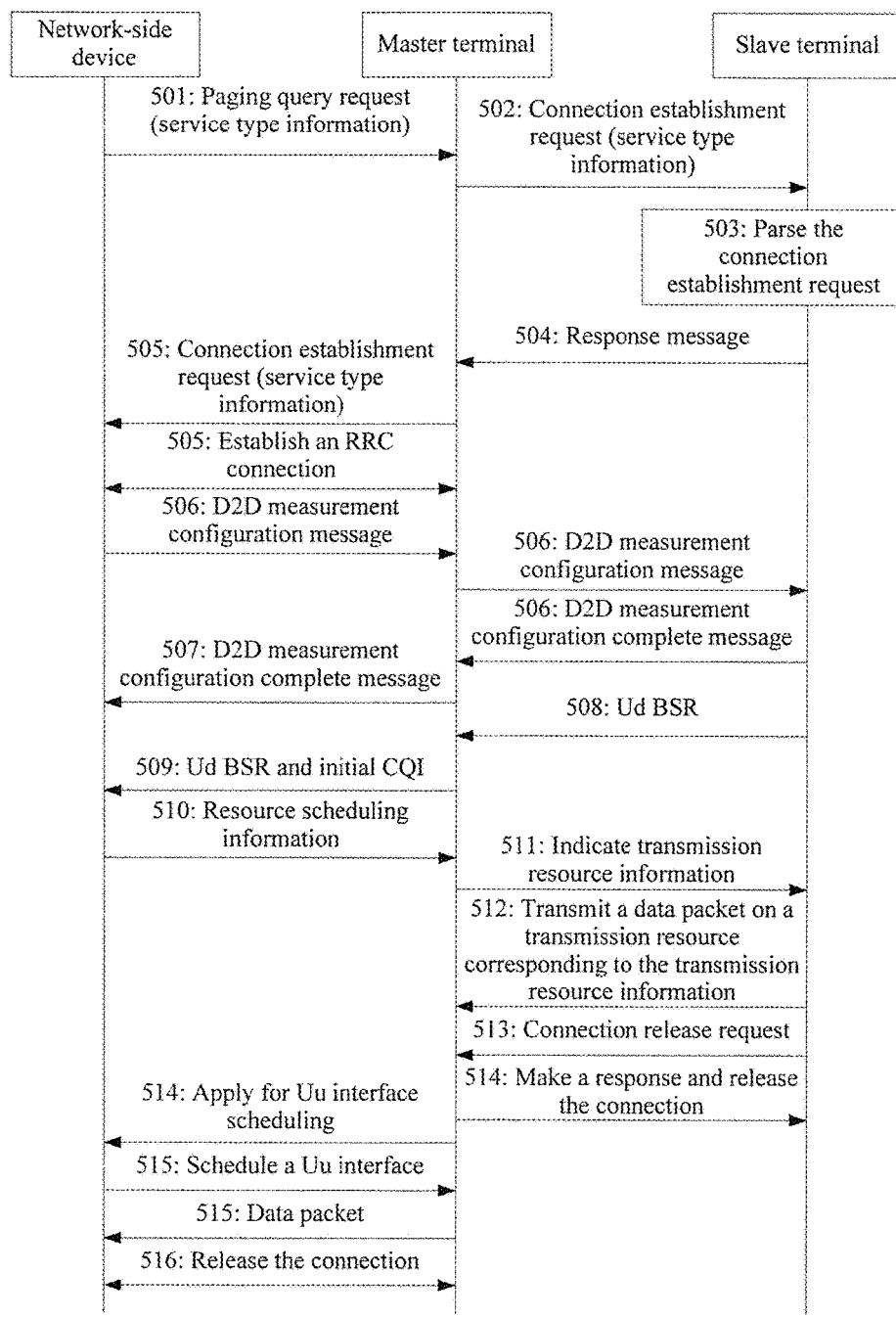
FIG. 5 is a schematic diagram of steps of a communication method according to Embodiment 5 of the present invention.

As shown in FIG. 5, FIG. 5 is a schematic diagram of steps of a communication method according to Embodiment 5 of the present invention. The communication method mainly includes the following steps:

Step 501: A master terminal located within network coverage receives a paging query request sent by a network-side device, where the paging query request includes service type information of a data packet that the network-side device requests a slave terminal located beyond the network coverage to report.

Step 502: The master terminal initiates a connection establishment request including the service type information to the slave terminal by using a pre-synchronized static resource.

Step 503: The slave terminal parses the received connection establishment request according to a D2D identifier of the master terminal.

If the slave terminal correctly parses the received connection establishment request according to the D2D identifier of the corresponding master terminal, it indicates that the terminal currently sending the connection establishment request is a master terminal corresponding to the slave terminal, and subsequent steps may continue to be performed; otherwise, the current communication process ends.

Step 504: After successfully parsing the connection establishment request, the slave terminal returns a response message to the master terminal, and completes a connection establishment handshake with the master terminal.

Step 505: The master terminal establishes a connection to the network-side device, where a connection establishment request that is sent by the master terminal to the network-side device carries the service type information, so that the network-side device determines, according to the service type information, that current communication is a communication process of reporting the data packet by the slave terminal.

In this case, a D2D connection is established between the master terminal and the slave terminal, and a common communication connection is established between the master terminal and the network-side device.

Step 506: The network-side device configures measurement information for twin UEs.

A specific implementation manner of step 506 includes but is not limited to:

First, the network-side device determines, according to the received service type information, a transmission resource used to transmit the data packet between the master terminal and the slave terminal; and sends, to the master terminal, a D2D measurement configuration message carrying transmission resource information corresponding to the transmission resource.

The transmission resource may include a part or all of the pre-synchronized static resource, and may further include another transmission resource that can be used to transmit the data packet between the master terminal and the slave terminal.

Then, the master terminal sends the D2D measurement configuration message to the slave terminal by using the pre-synchronized static resource.

Finally, the slave terminal performs measurement on the transmission resource corresponding to the transmission resource information in the D2D measurement configuration message; and after the measurement is complete, sends a D2D measurement configuration complete message to the master terminal by using the pre-synchronized static resource.

Step 507: The master terminal reports the D2D measurement configuration complete message to the network-side device. A process of measuring the transmission resource is complete.

The foregoing step 506 and step 507 are preferred steps in this embodiment of the present invention. In this embodiment of the present invention, a measurement operation may not be performed on the transmission resource, and data packet transmission may be directly performed between the master terminal and the slave terminal by using the pre-synchronized static resource.

Step 508: The slave terminal sends a Ud BSR to the master terminal.

The Ud BSR is a parameter used for an initial scheduling operation. If a matched scheduling parameter is determined between the master terminal and the slave terminal according to a service type and a preset protocol, the slave terminal may not send the Ud BSR to the master terminal in step 508.

Step 509: The master terminal initiates an SR to report the Ud BSR and an initial CQI to the network-side device.

Step 510: The network-side device sends, to the master terminal, resource scheduling information for performing data packet transmission between the master terminal and the slave terminal In step 510, the network-side device determines, according to the Ud BSR and the initial CQI that are reported by the master terminal, and the D2D measurement configuration complete message received in the process of measuring the transmission resource, a transmission resource for performing D2D transmission between the master terminal and the slave terminal; and sends transmission resource information corresponding to the transmission resource to the master terminal by using the resource scheduling information to carry the transmission resource information.

Step 511: After detecting the transmission resource information from the resource scheduling information, the master terminal indicates the transmission resource information to the slave terminal by using an indication message.

Optionally, the master terminal may further add a field in the indication message sent to the terminal, and uses the added field to carry a transmission start message, so that when a time specified in the transmission start message arrives, the slave terminal sends the data packet on the transmission resource corresponding to the transmission resource information.

Step 512: The slave terminal sends the data packet to the master terminal on the transmission resource corresponding to the transmission resource information.

Step 513: After the data packet transmission between the master terminal and the slave terminal ends, the slave terminal initiates a connection release request to the master terminal.

Step 514: The master terminal responds to the request of the slave terminal, and releases the connection to the slave terminal.

Step 515: The master terminal reports, to the network-side device, the data packet sent by the slave terminal.

Step 516: After the master terminal completely sends the data packet to the network-side device, the master terminal requests the network-side device to release the connection to the network-side device. The current communication process ends.

The solution in Embodiment 5 in the foregoing is described by using an example in which a master terminal receives, after a connection is established between the master terminal and a network-side device, a data packet sent by a slave terminal. In Embodiment 6 of the present invention, the solution in Embodiment 4 of the present invention is described in detail by using an example in which a master terminal first receives a data packet sent by a slave terminal, and then establishes a connection to a network-side device.

Embodiment 6

Figure 6:
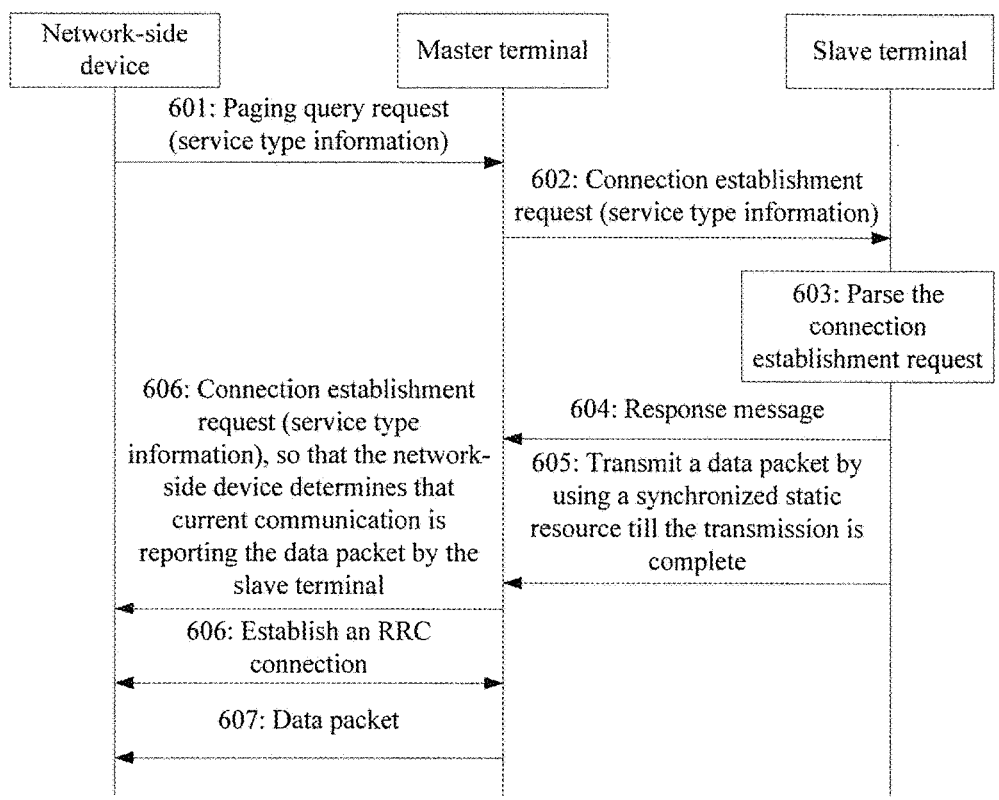
FIG. 6 (*a*) and FIG. 6 (*b*) are schematic diagrams of steps of a communication method according to Embodiment 6 of the present invention.
Figure 6:
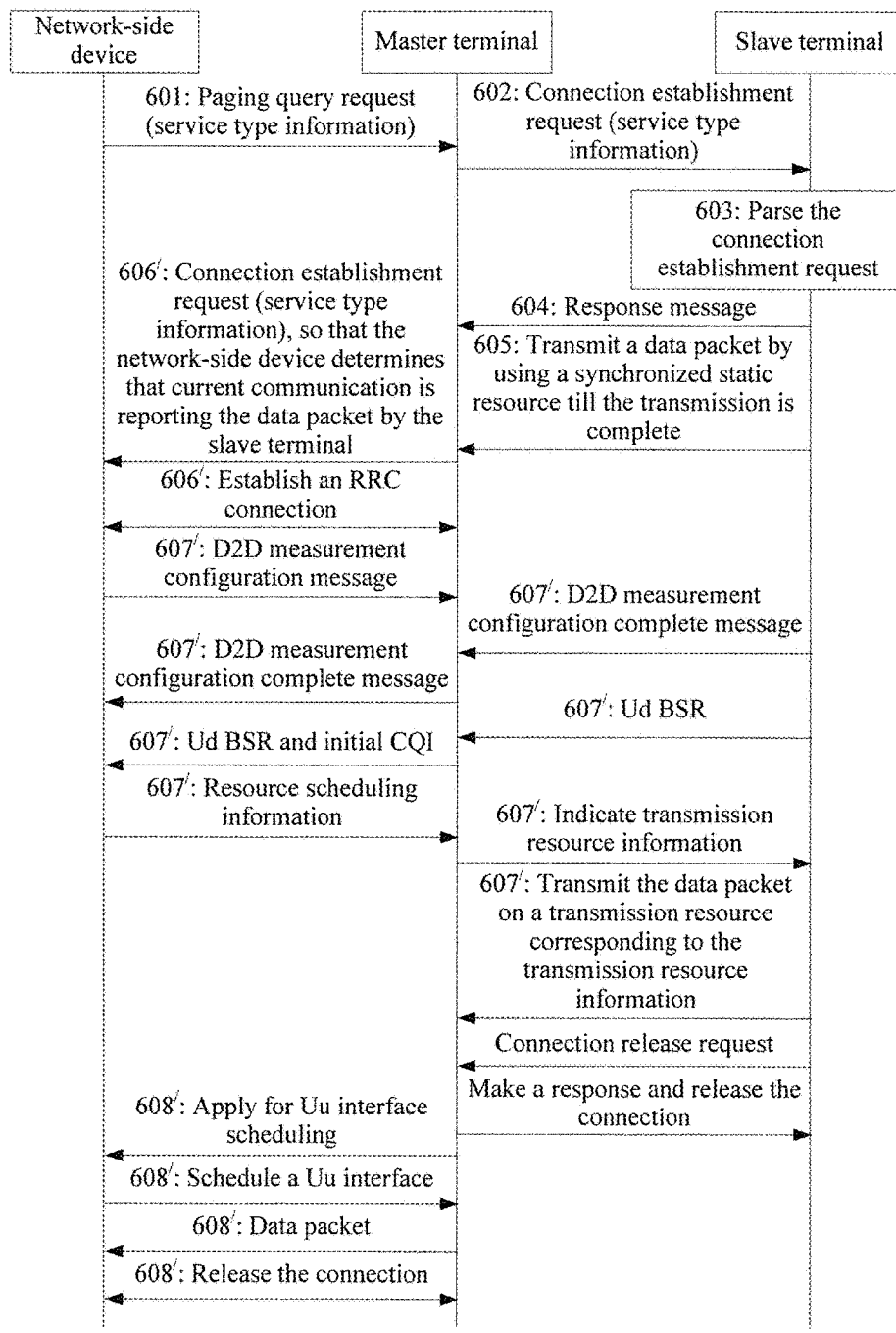

As shown in FIG. 6 (a), FIG. 6 (a) is a schematic diagram of steps of a communication method according to Embodiment 6 of the present invention. The communication method mainly includes the following steps:

Step 601: A master terminal located within network coverage receives a paging query request sent by a network-side device, where the paging query request includes service type information of a data packet that the network-side device requests a slave terminal located beyond the network coverage to report.

Step 602: The master terminal initiates a connection establishment request including the service type information to the slave terminal by using a pre-synchronized static resource.

Step 603: The slave terminal parses the received connection establishment request according to a D2D identifier of the master terminal.

Step 604: After successfully parsing the connection establishment request, the slave terminal returns a response message to the master terminal, and completes a connection establishment handshake with the master terminal.

Step 605: The master terminal receives, by using the pre-synchronized static resource, the data packet sent by the slave terminal.

Step 606: After the slave terminal completely sends the data packet, the master terminal establishes a connection to the network-side device, where a connection establishment request that is sent by the master terminal to the network-side device carries the service type information, so that the network-side device determines, according to the service type information, that current communication is a communication process of reporting the data packet by the slave terminal.

Step 607: The master terminal reports, to the network-side device, the data packet sent by the slave terminal. The current communication process is complete.

The foregoing solution of step 601 to step 607 is described by using an example in which a master terminal establishes a connection to a network-side device after completing data packet transmission with a slave terminal. Alternatively, the master terminal may establish the connection to the network-side device in a process of performing data packet transmission with the slave terminal, that is, before step 605 ends, as shown in FIG. 6 (b), the following steps are further included:

Step 606': Before the slave terminal completely sends the data packet, the master terminal establishes a connection to the network-side device, where a connection establishment request that is sent by the master terminal to the network-side device carries the service type information, so that the network-side device determines, according to the service type information, that current communication is a communication process of reporting the data packet by the slave terminal.

Step 607': The network-side device performs is resource configuration for a process of data packet transmission between the master terminal and the slave terminal, so that the master terminal and the slave terminal perform data packet transmission on a transmission resource configured by the network-side device.

An implementation process of step 607' is the same as an implementation process of step 506 to step 512 in Embodiment 5.

Step 608': The master terminal reports, to the network-side device, the data packet sent by the slave terminal. The current communication process is complete.

According to the solutions in Embodiment 5 and Embodiment 6 of the present invention, a technical effect that is the same as a technical effect of Embodiment 4 can be achieved; and further, efficiency of data packet transmission between a master terminal and a slave terminal can be effectively improved because a network-side device performs resource configuration for a process of data packet transmission between the master terminal and the slave terminal. In addition, when data packet transmission is performed between the master terminal and the slave terminal, the slave terminal performs data packet transmission only when a time specified in a transmission start message sent by the master terminal arrives, which implements scheduled sending of a data packet.

Corresponding to the solutions for reporting a data packet by a slave terminal to a network-side device in Embodiment 1 to Embodiment 6, the embodiments of the present invention further describe a solution for delivering a data packet by a network-side device to a slave terminal, which is described in the following.

Embodiment 7

Figure 7:
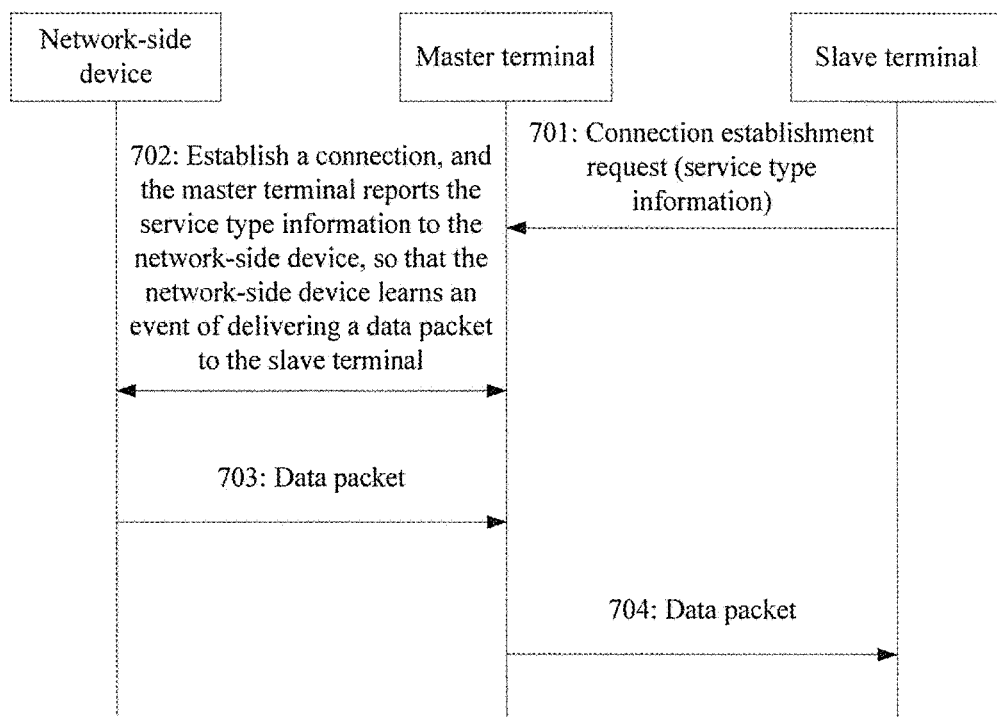
FIG. 7 is a schematic diagram of steps of a communication method according to Embodiment 7 of the present invention.

Embodiment 7 of the present invention describes a communication method in which a slave terminal actively requests a network-side device to deliver a data packet. As shown in FIG. 7, the method in Embodiment 7 mainly includes the following steps:

Step 701: A master terminal located within network coverage receives a connection establishment request by using a pre-synchronized static resource, where the connection establishment request is sent by a slave terminal located beyond the network coverage, and the connection establishment request includes service type information of a data packet that is delivered by a network-side device to the slave terminal.

The service type information that is sent by the slave terminal to the master terminal reflects content including but not limited to the following three aspects:

In a first aspect, it is reflected that a current data packet transmission process is a process in which the network-side device delivers, by using the master terminal, the data packet to the slave terminal located beyond the network coverage, but is not a process of common data packet transmission between the master terminal located within the network coverage and the network-side device.

In a second aspect, a flow direction of data packet transmission is reflected: the slave terminal reports a data packet to the network-side device or the network-side device delivers a data packet to the slave terminal. In Embodiment 7, the service type information reflects a communication process in which the network-side device delivers a data packet to the slave terminal. The service type information may carry an identifier indicating downlink transmission.

In a third aspect, a data volume of a data packet to be received by the slave terminal is reflected: the network-side device may perform, according to the service type information, resource configuration for a process of data packet transmission between the master terminal and the slave terminal, and the like.

A specific implementation process of step 701 is similar to a specific implementation process of step 101 in Embodiment 1.

Step 702: The master terminal establishes a connection to the network-side device, where a connection establishment request that is sent by the master terminal to the network-side device carries the service type information, so that the network-side device determines, according to the service type information, that current communication is a communication process of delivering the data packet to the slave terminal.

A specific implementation process of step 702 is similar to a specific implementation process of step 102 in Embodiment 1.

Step 703: The master terminal receives the data packet delivered by the network-side device.

In the solution of step 703, a process of transmitting the data packet between the master terminal located within the network coverage and the network-side device may be implemented according to an existing common technology. For example, when the network-side device is an eNB in an LTE network system, the master terminal may apply for Uu interface scheduling according to a standard procedure to receive the data packet sent by the eNB.

It should be noted that in the solution of this embodiment, a sequence of a process of receiving, by the master terminal, the data packet sent by the network-side device and a process of establishing, by the master terminal, a connection to the slave terminal is not fixed. In an actual running process, a proper execution sequence may be selected according to an actual situation.

Step 704: The master terminal sends the data packet to the slave terminal by using a connection established with the slave terminal.

In the solution of step 704, after establishing the connection to the network-side device, the master terminal may return a response message to the slave terminal, and complete a connection establishment handshake with the slave terminal.

The data packet may be transmitted between the master terminal and the slave terminal directly by using the pre-synchronized static resource; the network-side device may perform resource scheduling for a process of D2D transmission between the master terminal and the slave terminal, and the master terminal and the slave terminal perform data packet transmission by using a resource scheduled by the network-side device; or the master terminal and the slave terminal may perform data packet transmission by using the pre-synchronized static resource and a resource scheduled by the network-side device together.

According to the solution in Embodiment 7 of the present invention, a connection is established between a slave terminal in twin UEs that is located beyond network coverage and a master terminal within the network coverage, a connection is established between the master terminal and a network-side device, and the network-side device indirectly sends a data packet to the slave terminal, so that a terminal beyond the network coverage can communicate with the network-side device, which is of great significance for a normal communication process of the terminal beyond the network coverage. In addition, before the network-side device delivers the data packet, the network-side device has determined, according to received service type information, that current communication is a process of delivering the data packet to the slave terminal, but is not a process of common communication with the master terminal, which avoids a problem of a communication failure caused by that the network-side device performs communication according to a common communication process.

Based on the solution in Embodiment 7, the network-side device may further perform, according to the received service type information, resource configuration for a process of data packet transmission between the master terminal and the slave terminal. A specific execution process is similar to an execution process in Embodiment 2, and a difference lies in that in the solution in Embodiment 2, a data packet is reported from the slave terminal to the network-side device via the master terminal; while based on the solution in Embodiment 7, a data packet is delivered from the network-side device to the slave terminal via the master terminal.

In addition, based on the solution in Embodiment 7, the master terminal may directly send the data packet to the slave terminal by using the pre-synchronized static resource. Certainly, before the data packet is completely sent, the network-side device may further perform, according to the received service type information, resource configuration for the process of data packet transmission between the master terminal and the slave terminal, so that the data packet is first transmitted between the master terminal and the slave terminal by using the pre-synchronized static resource, and after the network-side device performs configuration for the master terminal and the slave terminal, the data packet may be transmitted between the master terminal and the slave terminal by using a configured resource. A specific execution process is similar to an execution process in Embodiment 3, and a difference lies in that in the solution in Embodiment 3, a data packet is reported from the slave terminal to the network-side device via the master terminal; while based on the solution in Embodiment 7, a data packet is delivered from the network-side device to the slave terminal via the master terminal.

Embodiment 7 in the foregoing is described by using an example in which a slave terminal actively requests a network-side device to deliver a data packet. The solutions in the embodiments of the present invention are not limited to a solution in which a network-side device actively delivers a data packet to a slave terminal, which is described in the following by using Embodiment 8.

Embodiment 8

Figure 8:
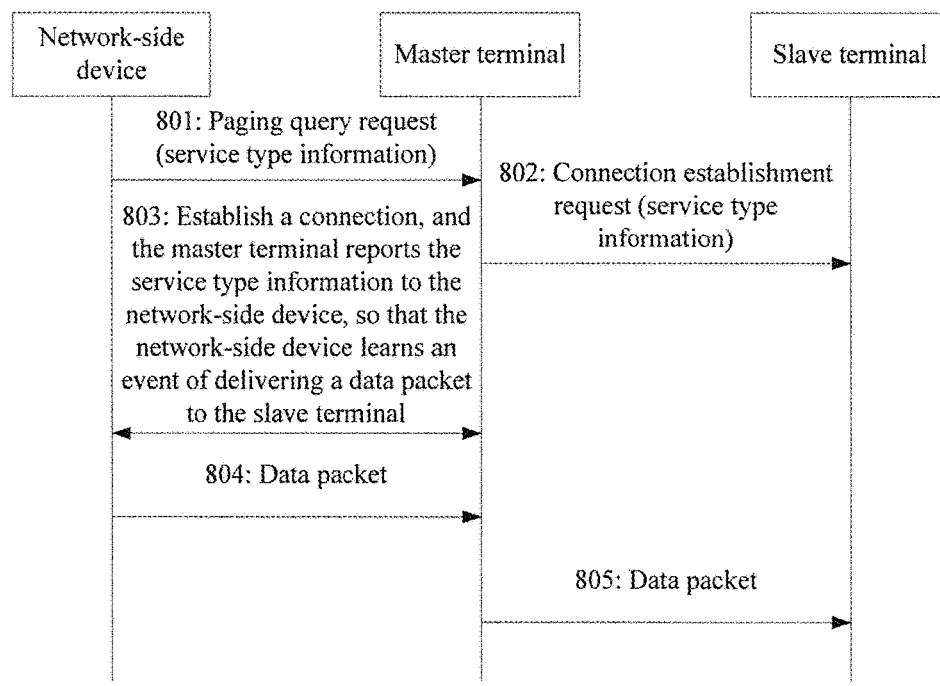
FIG. 8 is a schematic diagram of steps of a communication method according to Embodiment 8 of the present invention.

As shown in FIG. 8, FIG. 8 is a schematic diagram of steps of a communication method according to Embodiment 8 of the present invention. The communication method mainly includes the following steps:

Step 801: A master terminal located within network coverage receives a paging query request sent by a network-side device, where the paging query request includes service type information of a data packet that is delivered by the network-side device to a slave terminal located beyond the network coverage.

In the solution of step 801, when expecting to deliver data to the slave terminal, the network-side device may determine, according to information of twin UEs that is recorded during initialized network registration, the master terminal corresponding to the slave terminal, and send the paging query request to the master terminal within the network coverage.

The service type information in Embodiment 8 may reflect content of the following three aspects:

In a first aspect, it is reflected that a current data packet transmission process is a process in which the network-side device delivers, by using the master terminal, the data packet to the slave terminal located beyond the network coverage, but is not a process of common data packet transmission between the master terminal located within the network coverage and the network-side device.

In a second aspect, a flow direction of data packet transmission is reflected: the slave terminal reports a data packet to the network-side device or the network-side device delivers a data packet to the slave terminal. In Embodiment 8, the service type information indicates a process in which the network-side device delivers a data packet to the slave terminal, and may carry an identifier indicating downlink transmission.

In a third aspect, a data volume of a data packet that the network-side device expects to deliver to the slave terminal is reflected. The network-side device may perform, according to the service type information, resource configuration for a process of data packet transmission between the master terminal and the slave terminal, the master terminal may determine, according to the service type information, a size of space that needs to be opened up for storing the data packet, and the slave terminal may determine, according to the service type information, a device resource (for example, a memory resource) required to receive the data packet.

Step 802: The master terminal sends a connection establishment request including the service type information to the slave terminal by using a pre-synchronized static resource.

Step 803: The master terminal establishes a connection to the network-side device, where a connection establishment request that is sent by the master terminal to the network-side device carries the service type information, so that the network-side device determines, according to the service type information, that current communication is a communication process of delivering the data packet to the slave terminal.

An implementation process of step 803 is similar to an implementation process of step 102 in Embodiment 1.

Step 804: The master terminal receives the data packet delivered by the network-side device.

Step 805: The master terminal sends the data packet to the slave terminal by using a connection established with the slave terminal.

Based on the solution in Embodiment 8, the network-side device may further perform, according to the received service type information, resource configuration for a process of data packet transmission between the master terminal and the slave terminal. A specific execution process is similar to an execution process in Embodiment 2, and a difference lies in that in the solution in Embodiment 2, a data packet is reported from the slave terminal to the network-side device via the master terminal; while based on the solution in Embodiment 8, a data packet is delivered from the network-side device to the slave terminal via the master terminal.

In addition, based on the solution in Embodiment 8, the master terminal may directly send the data packet to the slave terminal by using the pre-synchronized static resource. Certainly, before the data packet is completely sent, the network-side device may further perform, according to the received service type information, resource configuration for the process of data packet transmission between the master terminal and the slave terminal, so that the data packet is first transmitted between the master terminal and the slave terminal by using the pre-synchronized static resource, and after the network-side device performs configuration for the master terminal and the slave terminal, the data packet may be transmitted between the master terminal and the slave terminal by using a configured resource. A specific execution process is similar to an execution process in Embodiment 3, and a difference lies in that in the solution in Embodiment 3, a data packet is reported from the slave terminal to the network-side device via the master terminal; while based on the solution in Embodiment 8, a data packet is delivered from the network-side device to the slave terminal via the master terminal.

Embodiment 9

Figure 9:
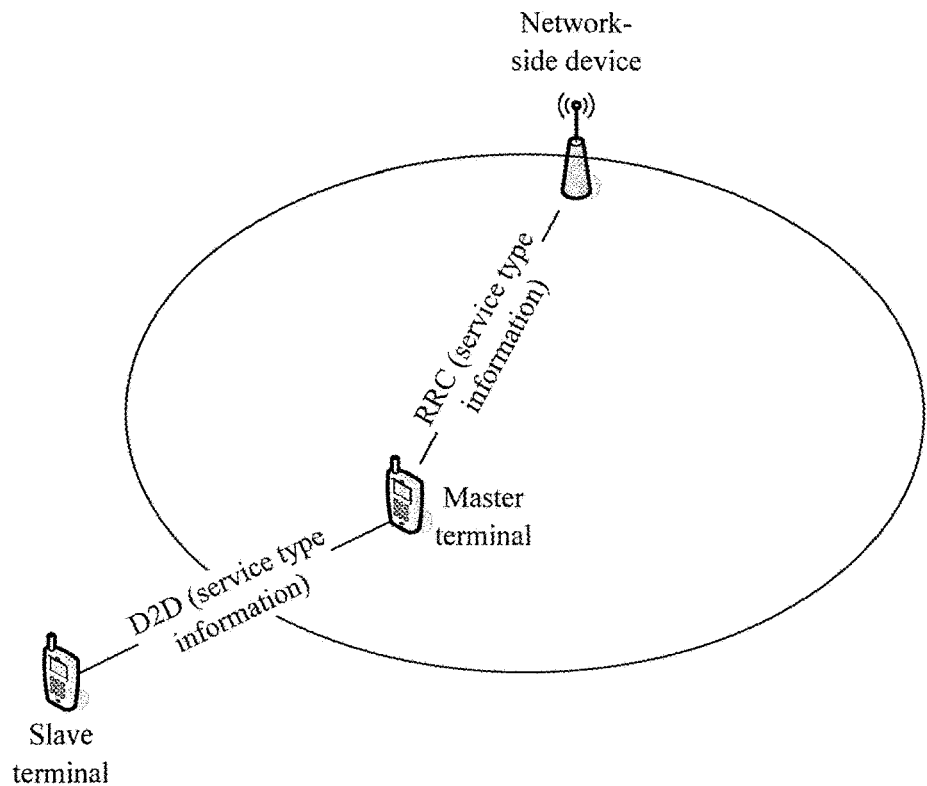
FIG. 9 is a schematic structural diagram of a communications system according to Embodiment 9 of the present invention.

Embodiment 9 of the present invention describes a communications system that has a same inventive concept as Embodiment 1 to Embodiment 3. As shown in FIG. 9, the communications system includes a master terminal located within network coverage, a slave terminal located beyond the network coverage, and a network-side device, where:

the master terminal is configured to receive a connection establishment request by using a pre-synchronized static resource, where the connection establishment request is sent by the slave terminal, and the connection establishment request includes service type information of a data packet reported by the slave terminal; establish a connection to the network-side device; and report, to the network-side device, the data packet that is sent by the slave terminal by using an established connection, where D2D communication is established between the master terminal and the slave terminal, and common communication between a terminal and a network side is established between the master terminal and the network-side device, for example, RRC communication;

the slave terminal is configured to send the connection establishment request to the master terminal, and send the data packet to the master terminal after establishing the connection to the master terminal; and the network-side device is configured to establish the connection to the master terminal; determine, according to the service type information carried in a connection establishment request sent by the master terminal, that current communication is a communication process of reporting the data packet by the slave terminal; and receive the data packet reported by the master terminal.

A specific communication process among the foregoing master terminal, slave terminal, and network-side device is similar to the description in Embodiment 1.

Preferably, the network-side device is further configured to send a measurement configuration message including transmission resource information to the master terminal, where a transmission resource corresponding to the transmission resource information is a transmission resource that is determined by the network-side device according to the service type information and that is used to transmit the data packet between the master terminal and the slave terminal; and receive a measurement configuration complete message reported by the master terminal;

the master terminal is further configured to send the received measurement configuration message to the slave terminal; receive the measurement configuration complete message that is generated after the slave terminal performs measurement on the transmission resource corresponding to the transmission resource information in the measurement configuration message; and report the measurement configuration complete message to the network-side device; and the slave terminal is further configured to perform measurement on the transmission resource corresponding to the transmission resource information in the measurement configuration message that is sent by the master terminal, and send the generated measurement configuration complete message to the master terminal.

Preferably, the master terminal is specifically configured to receive resource scheduling information that is determined and sent by the network-side device according to the measurement configuration complete message and that is used for data packet transmission between the master terminal and the slave terminal; indicate transmission resource information in the resource scheduling information to the slave terminal; and receive the data packet that is sent by the slave terminal on a transmission resource corresponding to the transmission resource information in the resource scheduling information; and the slave terminal is specifically configured to send the data packet to the master terminal on the transmission resource corresponding to the transmission resource information that is indicated by the master terminal.

Preferably, the master terminal is further configured to indicate a transmission start message to the slave terminal; and the slave terminal is further configured to send, according to an indication of the transmission start message, the data packet on the transmission resource corresponding to the transmission resource information in the resource scheduling information.

The foregoing optimization solution for the master terminal, the slave terminal, and the network-side device is similar to the description in Embodiment 2.

Preferably, the master terminal is specifically configured to: before establishing the connection to the network-side device, receive, by using the pre-synchronized static resource, the data packet sent by the slave terminal.

Preferably, the master terminal is specifically configured to: before completely receiving, by using the pre-synchronized static resource, the data packet sent by the slave terminal, establish the connection to the network-side device; receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is sent after the slave terminal performs measurement on the transmission resource corresponding to the transmission resource information.

Preferably, the master terminal is further configured to receive resource scheduling information that is determined and sent by the network-side device according to the measurement configuration complete message and that is used for data packet transmission between the master terminal and the slave terminal; indicate transmission resource information in the resource scheduling information to the slave terminal; and receive the data packet that is sent by the slave terminal on a transmission resource corresponding to the transmission resource information in the resource scheduling information.

The foregoing optimization solution for the master terminal, the slave terminal, and the network-side device is similar to the description in Embodiment 3.

Embodiment 10

An embodiment of the present invention describes a communications system that has a same inventive concept as Embodiment 4 to Embodiment 6. The communications system includes a master terminal located within network coverage, a slave terminal located beyond the network coverage, and a network-side device, where:

the master terminal is configured to receive a paging query request sent by the network-side device, where the paging query request includes service type information of a data packet that the network-side device requests the slave terminal to report; send a connection establishment request including the service type information to the slave terminal by using a pre-synchronized static resource, and establish a connection to the network-side device; and report, to the network-side device, the data packet that is sent by the slave terminal by using an established connection;

the network-side device is configured to send the paging query request to the master terminal; when establishing the connection to the master terminal, determine, according to the service type information carried in a connection establishment request sent by the master terminal, that current communication is a communication process of reporting the data packet by the slave terminal; and receive the data packet reported by the master terminal; and the slave terminal is configured to: after establishing the connection to the master terminal, send the data packet to the master terminal.

A specific communication process among the foregoing master terminal, slave terminal, and network-side device is similar to the description in Embodiment 4.

Preferably, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is sent after the slave terminal performs measurement on the transmission resource corresponding to the transmission resource information in the measurement configuration message;

the network-side device is further configured to send the measurement configuration message to the master terminal, and receive the measurement configuration complete message reported by the master terminal; and the slave terminal is further configured to perform measurement according to the transmission resource corresponding to the transmission resource information in the measurement configuration message that is sent by the master terminal, and send the generated measurement configuration complete message to the master terminal.

Preferably, the master terminal is specifically configured to: after receiving resource scheduling information that is determined and sent by the network-side device according to the measurement configuration complete message and that is used for data packet transmission between the master terminal and the slave terminal, indicate transmission resource information in the resource scheduling information to the slave terminal; and receive the data packet that is sent by the slave terminal on a transmission resource corresponding to the transmission resource information in the resource scheduling information; and the slave terminal is specifically configured to send the data packet to the master terminal on the transmission resource corresponding to the transmission resource information that is indicated by the master terminal.

Preferably, the master terminal is further configured to indicate a transmission start message to the slave terminal; and the slave terminal is specifically configured to send, according to an indication of the transmission start message, the data packet on the transmission resource corresponding to the transmission resource information in the resource scheduling information.

The foregoing optimization solution for the master terminal, the slave terminal, and the network-side device is similar to the description in Embodiment 5.

Preferably, the master terminal is specifically configured to: before establishing the connection to the network-side device, receive, by using the pre-synchronized static resource, the data packet sent by the slave terminal.

Preferably, the master terminal is specifically configured to: before completely receiving, by using the pre-synchronized static resource, the data packet sent by the slave terminal, establish the connection to the network-side device; receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is sent after the slave terminal performs measurement on the transmission resource corresponding to the transmission resource information.

Preferably, the master terminal is specifically configured to: after receiving resource scheduling information that is determined and sent by the network-side device according to the measurement configuration complete message and that is used for data packet transmission between the master terminal and the slave terminal, indicate transmission resource information in the resource scheduling information to the slave terminal; and receive the data packet that is sent by the slave terminal on a transmission resource corresponding to the transmission resource information in the resource scheduling information; and the slave terminal is specifically configured to send, according to an indication of the master terminal, the data packet on the transmission resource corresponding to the transmission resource information.

The foregoing optimization solution for the master terminal, the slave terminal, and the network-side device is similar to the description in Embodiment 6.

Embodiment 11

Embodiment 11 of the present invention describes a communications system that has a same inventive concept as Embodiment 7. The communications system includes a master terminal located within network coverage, a slave terminal located beyond the network coverage, and a network-side device, where:

the master terminal is configured to receive a connection establishment request by using a pre-synchronized static resource, where the connection establishment request is sent by the slave terminal, and the connection establishment request includes service type information of a data packet that is delivered by the network-side device to the slave terminal; establish a connection to the network-side device; and receive the data packet delivered by the network-side device, and send the data packet to the slave terminal by using a connection established with the slave terminal;

the network-side device is configured to establish the connection to a network-side network; determine, according to the service type information carried in a connection establishment request sent by the master terminal, that current communication is a communication process of delivering the data packet to the slave terminal; and deliver the data packet to the master terminal; and the slave terminal is configured to send the connection establishment request to the master terminal, and receive the data packet sent by the master terminal.

A specific communication process among the foregoing master terminal, slave terminal, and network-side device is similar to the description in Embodiment 7.

Preferably, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is generated after the slave terminal performs measurement on the transmission resource corresponding to the transmission resource information in the measurement configuration message.

Preferably, the master terminal is specifically configured to receive resource scheduling information that is determined and sent by the network-side device according to the measurement configuration complete message and that is used for data packet transmission between the master terminal and the slave terminal; indicate transmission resource information in the resource scheduling information to the slave terminal; and send the data packet to the slave terminal on a transmission resource corresponding to the transmission resource information in the resource scheduling information; and the slave terminal is specifically configured to receive, according to an indication of the master terminal and on the transmission resource corresponding to the transmission resource information, the data packet sent by the master terminal.

Preferably, the master terminal is further configured to indicate a transmission start message to the slave terminal; and the slave terminal is specifically configured to receive, according to an indication of the transmission start message and on the transmission resource corresponding to the transmission resource information in the resource scheduling information, the data packet sent by the master terminal.

Preferably, the master terminal is specifically configured to send the data packet to the slave terminal by using the pre-synchronized static resource.

Preferably, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is generated after the slave terminal performs measurement on the transmission resource corresponding to the transmission resource information.

Preferably, the master terminal is specifically configured to: after receiving resource scheduling information that is determined and sent by the network-side device according to the measurement configuration complete message and that is used for data packet transmission between the master terminal and the slave terminal, indicate transmission resource information in the resource scheduling information to the slave terminal; and send the data packet to the slave terminal on a transmission resource corresponding to the transmission resource information in the resource scheduling information; and the slave terminal is specifically configured to receive, according to an indication of the master terminal and on the transmission resource corresponding to the transmission resource information, the data packet sent by the master terminal.

Embodiment 12

Embodiment 12 of the present invention describes a communications system that has a same inventive concept as Embodiment 8. The communications system includes a master terminal located within network coverage, a slave terminal located beyond the network coverage, and a network-side device, where:

the master terminal is configured to receive a paging query request sent by the network-side device, where the paging query request includes service type information of a data packet that is delivered by the network-side device to the slave terminal located beyond the network coverage; send a connection establishment request including the service type information to the slave terminal by using a pre-synchronized static resource, and establish a connection to the network-side device; and receive the data packet delivered by the network-side device, and send the data packet to the slave terminal by using a connection established with the slave terminal;

the network-side device is configured to send the paging query request to the master terminal; establish the connection to the master terminal; determine, according to the service type information carried in a connection establishment request sent by the master terminal, that current communication is a communication process of delivering the data packet to the slave terminal; and send the data packet to the master terminal; and the slave terminal is configured to receive the connection establishment request sent by the master terminal, and receive, by using the connection established with the master terminal, the data packet sent by the master terminal.

A specific communication process among the foregoing master terminal, slave terminal, and network-side device is similar to the description in Embodiment 8.

Preferably, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is generated after the slave terminal performs measurement on the transmission resource corresponding to the transmission resource information in the measurement configuration message.

Preferably, the master terminal specifically receives resource scheduling information that is determined and sent by the network-side device according to the measurement configuration complete message and that is used for data packet transmission between the master terminal and the slave terminal; indicates transmission resource information in the resource scheduling information to the slave terminal; and sends the data packet to the slave terminal on a transmission resource corresponding to the transmission resource information in the resource scheduling information; and the slave terminal is specifically configured to receive, on the transmission resource corresponding to the transmission resource information that is indicated by the master terminal, the data packet sent by the master terminal.

Preferably, the master terminal is further configured to indicate a transmission start message to the slave terminal; and the slave terminal is specifically configured to receive, according to an indication of the transmission start message and on the transmission resource corresponding to the transmission resource information in the resource scheduling information, the data packet sent by the master terminal.

Preferably, the master terminal is specifically configured to send the data packet to the slave terminal by using the pre-synchronized static resource.

Preferably, the master terminal is further configured to receive a measurement configuration message that includes transmission resource information and that is sent by the network-side device, where a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is generated after the slave terminal performs measurement on the transmission resource corresponding to the transmission resource information.

Preferably, the master terminal is specifically configured to receive resource scheduling information that is determined and sent by the network-side device according to the measurement configuration complete message and that is used for data packet transmission between the master terminal and the slave terminal; indicate transmission resource information in the resource scheduling information to the slave terminal; and send the data packet to the slave terminal on a transmission resource corresponding to the transmission resource information in the resource scheduling information; and the slave terminal is specifically configured to receive, according to an indication of the master terminal and on the transmission resource corresponding to the transmission resource information, the data packet sent by the master terminal.

Embodiment 13

Figure 10:
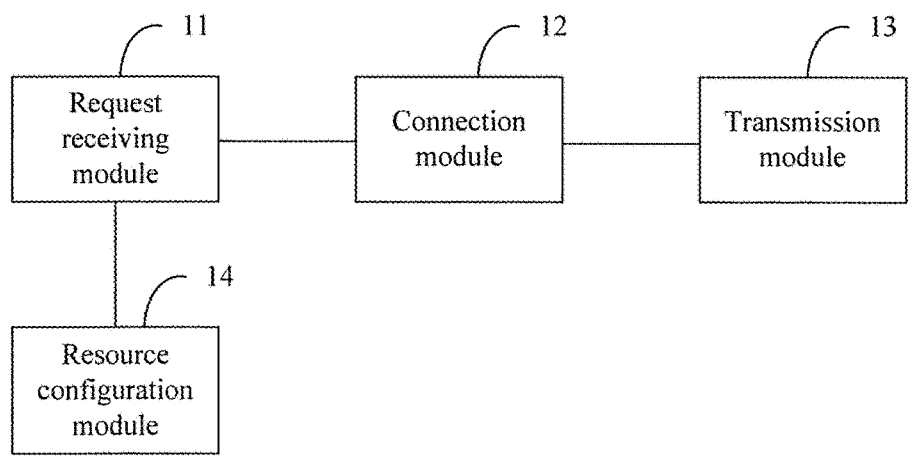
FIG. 10 and FIG. 11 are schematic structural diagrams of a network-side device according to Embodiment 13 of the present invention.

Embodiment 13 of the present invention describes a network-side device that can execute the methods and system solutions in Embodiment 1 to Embodiment 12. As shown in FIG. 10, the network-side device includes a request receiving module 11, a connection module 12, and a transmission module 13, where:

the request receiving module 11 is configured to receive a connection establishment request that carries service type information and that is sent by a master terminal located within network coverage; and determine, according to the service type information, whether current communication is a communication process of delivering a data packet to a slave terminal located beyond the network coverage or a communication process of receiving a data packet reported by the slave terminal;

the connection module 12 is configured to establish a connection to the master terminal; and the transmission module 13 is configured to deliver the data packet to the slave terminal by using the master terminal, or receive the data packet that is reported by the slave terminal by using the master terminal.

Preferably, the network-side device further includes a resource configuration module 14, configured to: after determining, according to the service type information, a transmission resource that is used to transmit the data packet between the master terminal and the slave terminal, perform resource configuration for data transmission between the master terminal and the slave terminal.

Preferably, according to a difference between a case in which a network side actively requests to perform data packet transmission with the slave terminal and a case in which the slave terminal actively requests to perform data packet transmission with the network-side device, the network-side device may further include a module for sending a paging query request to the master terminal, and another functional module that can execute the methods and the system solutions in Embodiment 1 to Embodiment 12, and details are not described herein again.

Figure 11:
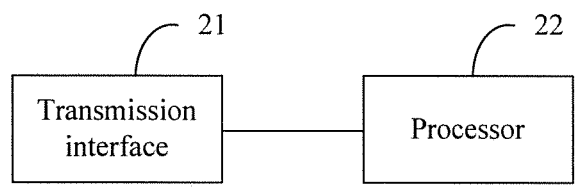

Corresponding to an architecture of the network-side device shown in FIG. 10, Embodiment 13 further describes a network-side device of another architecture, and as shown in FIG. 11, the network-side device includes a transmission interface 21 and a processor 22, where:

the transmission interface 21 is configured to receive a connection establishment request that carries service type information and that is sent by a master terminal located within network coverage, and serve as an interface for performing data packet transmission with the slave terminal; and the processor 22 is configured to: receive, by using the transmission interface 21, the connection establishment request that carries the service type information and that is sent by the master terminal; after determining, according to the service type information, whether current communication is a communication process of delivering a data packet to the slave terminal located beyond the network coverage or a communication process of receiving a data packet reported by the slave terminal, establish a connection to the master terminal; and then, by using the transmission interface 21, deliver the data packet to the slave terminal via the master terminal, or receive the data packet that is reported by the slave terminal via the master terminal.

Preferably, the processor 22 is further configured to: after determining, according to the service type information, a transmission resource that is used to transmit the data packet between the master terminal and the slave terminal, perform resource configuration for data transmission between the master terminal and the slave terminal.

Preferably, according to a difference between a case in which a network side actively requests to perform data packet transmission with the slave terminal and a case in which the slave terminal actively requests to perform data packet transmission with the network-side device, the processor 22 may be further configured to send a paging query request to the master terminal by using the transmission interface 21. In addition, the processor 22 further has another function capable of executing the methods and the system solutions in Embodiment 1 to Embodiment 12, and details are not described herein again.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

In a typical configuration, the computer device includes one or more processors (CPU), an input/output interface, a network interface, and a memory. The memory may include forms of a volatile memory, a random access memory (RAM), and/or a non-volatile memory in computer readable media, such as a read-only memory (ROM) or a flash memory (flash RAM). The memory is an example of the computer readable media. The computer readable media include permanent and temporary, and removable and irremovable media, and information may be stored by using any method or technology. The information may be a computer readable instruction, a data structure, a program module, or other data. For example, computer storage media include, but are not limited to, a phase change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a cassette-type tape, a magnetic tape, a disk storage or other magnetic storage devices or any other non-transmission medium, and can be used to store information that can be accessed by a calculation device. According to the definitions in this specification, the computer readable media do not include non-persistent computer readable media (transitory media), such as a modulated data signal and carrier.

Although some embodiments of the present application have been described, persons skilled in the art can make changes and modifications to these embodiments once they learn the basic inventive concept. Therefore, the following claims are intended to be construed as to cover the embodiments and all changes and modifications falling within the scope of the present application.

Obviously, persons skilled in the art can make various modifications and variations to the present application without departing from the spirit and scope of the present application. The present application is intended to cover these modifications and variations of the present application provided that they fall within the scope of protection defined by the following claims and their equivalent technologies.

What is claimed is:

1. A communication method, wherein the communication method comprises:
   receiving, by a master terminal located within network coverage, a connection establishment request by using a pre-synchronized static resource, wherein the connection establishment request is sent by a slave terminal located beyond the network coverage, and the connection establishment request comprises service type information of a data packet reported by the slave terminal;
   establishing, by the master terminal, a connection to a network-side device, wherein a connection establishment request that is sent by the master terminal to the network-side device carries the service type information, so that the network-side device determines, according to the service type information, that current communication is a communication process of reporting the data packet by the slave terminal;
   receiving, by the master terminal, a measurement configuration message that comprises transmission resource information and that is sent by the network-side device, wherein a transmission resource corresponding to the transmission resource information is a transmission resource that is determined by the network-side device according to the service type information and that is used to transmit the data packet between the master terminal and the slave terminal;
   sending, by the master terminal, the measurement configuration message to the slave terminal, and receiving a measurement configuration complete message that is generated after the slave terminal performs measurement on the transmission resource corresponding to the transmission resource information in the measurement configuration message;
   reporting, by the master terminal, the measurement configuration complete message to the network-side device; and
   reporting, by the master terminal to the network-side device, the data packet that is sent by the slave terminal by using an established connection.

2. The communication method according to claim 1, further comprising receiving, by the master terminal, the data packet sent by the slave terminal, by:
   receiving, by the master terminal, resource scheduling information that is determined and sent by the network-side device according to the measurement configuration complete message and that is used for data packet transmission between the master terminal and the slave terminal; and
   indicating, by the master terminal, transmission resource information in the resource scheduling information to the slave terminal, and receiving the data packet that is sent by the slave terminal on a transmission resource corresponding to the transmission resource information in the resource scheduling information.

3. The communication method according to claim 2, wherein the method further comprises:
   indicating, by the master terminal, a transmission start message to the slave terminal, to request the slave terminal to send, according to an indication of the transmission start message, the data packet on the transmission resource corresponding to the transmission resource information in the resource scheduling information.

4. A communication method, wherein the communication method comprises:
   receiving, by a master terminal located within network coverage, a paging query request sent by a network-side device, wherein the paging query request comprises service type information of a data packet that the network-side device requests a slave terminal located beyond the network coverage to report;
   sending, by the master terminal, a connection establishment request comprising the service type information to the slave terminal by using a pre-synchronized static resource, and establishing, by the master terminal, a connection to the network-side device, wherein a connection establishment request that is sent by the master terminal to the network-side device carries the service type information, so that the network-side device determines, according to the service type information, that current communication is a communication process of reporting the data packet by the slave terminal;
   receiving, by the master terminal, a measurement configuration message that comprises transmission resource information and that is sent by the network-side device, wherein a transmission resource corresponding to the transmission resource information is a transmission resource that is determined by the network-side device according to the service type information and that is used to transmit the data packet between the master terminal and the slave terminal;

sending, by the master terminal, the measurement configuration message to the slave terminal, and receiving a measurement configuration complete message that is obtained after the slave terminal performs measurement on the transmission resource corresponding to the transmission resource information in the measurement configuration message;

reporting, by the master terminal, the measurement configuration complete message to the network-side device; and reporting, by the master terminal to the network-side device, the data packet that is sent by the slave terminal by using an established connection.

5. The communication method according to claim 4, further comprising receiving, by the master terminal, the data packet sent by the slave terminal, by:

receiving, by the master terminal, resource scheduling information that is determined and sent by the network-side device according to the measurement configuration complete message and that is used for data packet transmission between the master terminal and the slave terminal; and indicating, by the master terminal, transmission resource information in the resource scheduling information to the slave terminal, and receiving the data packet that is sent by the slave terminal on a transmission resource corresponding to the transmission resource information in the resource scheduling information.

6. The communication method according to claim 5, wherein the method further comprises:

indicating, by the master terminal, a transmission start message to the slave terminal, to request the slave terminal to send, according to an indication of the transmission start message, the data packet on the transmission resource corresponding to the transmission resource information in the resource scheduling information.

7. The communication method according to claim 6, wherein before establishing, by the master terminal, a connection to the network-side device, the method further comprises:

receiving, by the master terminal by using the pre-synchronized static resource, the data packet sent by the slave terminal.

8. A communications system, wherein the communications system comprises a master terminal located within network coverage, a slave terminal located beyond the network coverage, and a network-side device, wherein:

the master terminal is configured to:
receive a connection establishment request by using a pre-synchronized static resource, wherein the connection establishment request is sent by the slave terminal, and the connection establishment request comprises service type information of a data packet reported by the slave terminal,
establish a connection to the network-side device,
report, to the network-side device, the data packet that is sent by the slave terminal by using an established connection,
send a received measurement configuration message to the slave terminal,
receive a measurement configuration complete message that is generated after the slave terminal performs measurement on a transmission resource corresponding to transmission resource information in the measurement configuration message, and
report the measurement configuration complete message to the network-side device;

the slave terminal is configured to:
send a connection establishment request to the master terminal,
send the data packet to the master terminal after establishing the connection to the master terminal,
perform measurement on the transmission resource corresponding to the transmission resource information in the measurement configuration message that is sent by the master terminal, and
send the generated measurement configuration complete message to the master terminal; and the network-side device is configured to:
establish the connection to the master terminal,
determine, according to the service type information carried in the connection establishment request sent by the master terminal, that current communication is a communication process of reporting the data packet by the slave terminal,
send the measurement configuration message comprising the transmission resource information to the master terminal, wherein the transmission resource corresponding to the transmission resource information is a transmission resource that is determined by the network-side device according to the service type information and that is used to transmit the data packet between the master terminal and the slave terminal, and
receive the measurement configuration complete message reported by the master terminal;

and receive the data packet reported by the master terminal.

9. The communications system according to claim 8, wherein:

the master terminal is configured to receive resource scheduling information that is determined and sent by the network-side device according to the measurement configuration complete message and that is used for data packet transmission between the master terminal and the slave terminal; indicate transmission resource information in the resource scheduling information to the slave terminal; and receive the data packet that is sent by the slave terminal on a transmission resource corresponding to the transmission resource information in the resource scheduling information; and the slave terminal is configured to send the data packet to the master terminal on the transmission resource corresponding to the transmission resource information that is indicated by the master terminal.

10. The communications system according to claim 9, wherein:

the master terminal is further configured to indicate a transmission start message to the slave terminal; and the slave terminal is further configured to send, according to an indication of the transmission start message, the data packet on the transmission resource corresponding to the transmission resource information in the resource scheduling information.

11. The communications system according to claim 8, wherein:

the master terminal is configured to: before establishing the connection to the network-side device, receive, by using the pre-synchronized static resource, the data packet sent by the slave terminal.

12. The communications system according to claim 11, wherein:
the master terminal is configured to: before completely receiving, by using the pre-synchronized static resource, the data packet sent by the slave terminal, establish the connection to the network-side device; receive a measurement configuration message that comprises transmission resource information and that is sent by the network-side device, wherein a transmission resource corresponding to the transmission resource information is a transmission resource that is determined by the network-side device according to the service type information and that is used to transmit the data packet between the master terminal and the slave terminal; send the measurement configuration message to the slave terminal; and report, to the network-side device, a measurement configuration complete message that is sent after the slave terminal performs measurement on the transmission resource corresponding to the transmission resource information.

13. A communications system, wherein the communications system comprises a master terminal located within network coverage, a slave terminal located beyond the network coverage, and a network-side device, wherein:
the master terminal is configured to:
receive a paging query request sent by the network-side device, wherein the paging query request comprises service type information of a data packet that the network-side device requests the slave terminal to report,
send a connection establishment request comprising the service type information to the slave terminal by using a pre-synchronized static resource,
establish a connection to the network-side device;
report, to the network-side device, the data packet that is sent by the slave terminal by using an established connection,
receive a measurement configuration message that comprises transmission resource information and that is sent by the network-side device, wherein a transmission resource corresponding to the transmission resource information is a transmission resource that is determined by the network-side device according to the service type information and that is used to transmit the data packet between the master terminal and the slave terminal,
send the measurement configuration message to the slave terminal, and
report, to the network-side device, a measurement configuration complete message that is sent after the slave terminal performs measurement on the transmission resource corresponding to the transmission resource information in the measurement configuration message;
the network-side device is configured to:
send the paging query request to the master terminal,
when establishing the connection to the master terminal, determine, according to the service type information carried in the connection establishment request sent by the master terminal, that current communication is a communication process of reporting the data packet by the slave terminal,
receive the data packet reported by the master terminal,
send the measurement configuration message to the master terminal, and
receive the measurement configuration complete message reported by the master terminal; and
the slave terminal is configured to:
after establishing the connection to the master terminal, send the data packet to the master terminal,
perform measurement according to the transmission resource corresponding to the transmission resource information in the measurement configuration message that is sent by the master terminal, and
send the generated measurement configuration complete message to the master terminal.

14. The communications system according to claim 13, wherein:
the master terminal is configured to: after receiving resource scheduling information that is determined and sent by the network-side device according to the measurement configuration complete message and that is used for data packet transmission between the master terminal and the slave terminal, indicate transmission resource information in the resource scheduling information to the slave terminal; and receive the data packet that is sent by the slave terminal on a transmission resource corresponding to the transmission resource information in the resource scheduling information; and
the slave terminal is configured to send the data packet to the master terminal on the transmission resource corresponding to the transmission resource information that is indicated by the master terminal.

15. The communications system according to claim 14, wherein:
the master terminal is further configured to indicate a transmission start message to the slave terminal; and
the slave terminal is configured to send, according to an indication of the transmission start message, the data packet on the transmission resource corresponding to the transmission resource information in the resource scheduling information.

16. The communications system according to claim 13, wherein: the master terminal is configured to: before establishing the connection to the network-side device, receive, by using the pre-synchronized static resource, the data packet sent by the slave terminal.

* * * * *